United States Patent
Omasta et al.

(10) Patent No.: US 11,247,699 B2
(45) Date of Patent: Feb. 15, 2022

(54) DRIVER ASSIST INTERFACE IN A VEHICLE

(71) Applicant: Volvo Car Corporation, Gothenburg (SE)

(72) Inventors: Tomas Omasta, Povazska Bystrica (SK); Mikael Gordh, Yterby (SE); Hanna Gerdeskans, Gothenburg (SE); Andrea Slaattelia Larsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 79 days.

(21) Appl. No.: 16/673,218

(22) Filed: Nov. 4, 2019

(65) Prior Publication Data

US 2021/0129858 A1 May 6, 2021

(51) Int. Cl.
*B60W 50/14* (2020.01)
*B60K 35/00* (2006.01)
*B60W 40/09* (2012.01)

(52) U.S. Cl.
CPC ............. *B60W 50/14* (2013.01); *B60K 35/00* (2013.01); *B60W 40/09* (2013.01); *B60K 2370/162* (2019.05); *B60K 2370/177* (2019.05); *B60W 2050/146* (2013.01)

(58) Field of Classification Search
CPC ....... G01C 21/26; G01C 21/365; G06T 11/60; B60W 50/14; B60W 40/09; B60W 2050/146; B60K 35/00; B60K 2370/177; B60K 2370/162
See application file for complete search history.

(56) References Cited

U.S. PATENT DOCUMENTS

| | | | |
|---|---|---|---|
| 6,611,744 B1 | 8/2003 | Shimazaki et al. | |
| 10,065,505 B1 | 9/2018 | Briggs et al. | |
| 10,093,323 B2 | 10/2018 | Kelly et al. | |
| 10,198,772 B2 | 2/2019 | Parameshwaran | |
| 2014/0309806 A1* | 10/2014 | Ricci | G06F 21/32 701/1 |
| 2016/0084661 A1* | 3/2016 | Gautama | G01C 21/365 701/400 |

(Continued)

OTHER PUBLICATIONS

Extended European search report received for European application No. 20205800.4 dated Mar. 12, 2021, 11 pages.

(Continued)

*Primary Examiner* — Omeed Alizada
(74) *Attorney, Agent, or Firm* — Amin, Turocy & Watson, LLP

(57) ABSTRACT

Systems, methods and computer program products that facilitate driver assist interface in a vehicle. A system can include a memory and a processor that executes computer executable components. The computer executable components can include: a monitoring component that monitors driver operation of a vehicle, an analysis component that analyzes the driver operation of the vehicle, a recommendation component that generates real-time recommendations regarding improving at least one of driver turning, accelerating or braking of the vehicle, and an interactive display component that generates a real-time graphical user interface that visually represents the real-time recommendations relative to the driver's current operation of the vehicle.

23 Claims, 14 Drawing Sheets

(56) References Cited

U.S. PATENT DOCUMENTS

2017/0140652 A1    5/2017  Hodges et al.
2017/0313323 A1*  11/2017  Tseng .................... B60W 10/00
2020/0166746 A1*  5/2020  Green ................ G02B 27/0101
2020/0307617 A1*  10/2020  Sakai ................. G01C 21/3697

OTHER PUBLICATIONS

Communication pursuant to Rules 70(2) and 70a(2) EPC and reference to Rule 39(1) EPC received for European Patent Application Serial No. 20205800.4 dated May 11, 2021, 2 pages.

* cited by examiner

DRIVER ASSIST INTERFACE IN A VEHICLE

TECHNICAL FIELD

Embodiments disclosed and claimed herein relate to techniques that facilitate driver assist interface in a vehicle.

BACKGROUND

Driver assist systems can assist drivers with recommendations associated with operation of a vehicle. Conventional systems generally utilize some combination of images, text, audio alerts and sounds in graphical user interfaces to convey recommendations to a driver. However, recommendations associated with factors such as turn radius, acceleration, deceleration or speed can change rapidly in varying degrees and combinations. In order for recommendations to be effective, a driver should be able to quickly understand which factors included in the recommendations are changing, the degree to which recommendations associated with one or more factors are changing and how such recommendations are interrelated. Conventional systems do not adequately convey the dynamic nature, complexity and varying degrees of recommendations associated with operation of a vehicle.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate driver assist interface in a vehicle.

Graphical user interfaces used by conventional systems to convey recommendations associated with driver operation of a vehicle can be improved by visually representing the real-time recommendation relative to a driver's current operation of the vehicle. This can include a visual representation of a driver's current operation of the vehicle overlaid onto a graphical representation of the recommended operation. This enables a driver to quickly understand the recommendations with a glance along with how the driver's operation of the vehicle compares to the recommendations in real time as recommendations change in response to driver operation. The interactive and dynamic nature of visually representing the real-time recommendation relative to a driver's current operation of the vehicle can keep the driver engaged, thus improving driver operation and safety.

In accordance with an embodiment, a system comprises: a memory and a processor that executes computer executable components. The computer executable components can include a monitoring component that monitors driver operation of a vehicle, an analysis component that analyzes the driver operation of the vehicle, a recommendation component that generates real-time recommendations regarding improving at least one of driver turning, accelerating or braking of the vehicle, and an interactive display component that generates a real-time graphical user interface that visually represents the real-time recommendations relative to the driver's current operation of the vehicle.

In some embodiments, elements described in connection with the disclosed systems can be embodied in different forms such as a computer-implemented method, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

Embodiments described herein include systems, methods, and computer program products that facilitate driver assist interface in a vehicle. A graphical user interface (GUI) visually represents real-time recommendations associated with a driver's operation of a vehicle relative to the driver's current operation of the vehicle. The GUI can include a visual representation of a driver's current operation of the vehicle overlaid onto a graphical representation of the recommended operation. This enables a driver to quickly understand the recommendations with a glance along with how the driver's operation of the vehicle compares to the recommendations in real time as recommendations change in response to driver operation. The interactive and dynamic nature of visually representing the real-time recommendation relative to a driver's current operation of the vehicle can keep the driver engaged, thus improving driver operation and safety.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
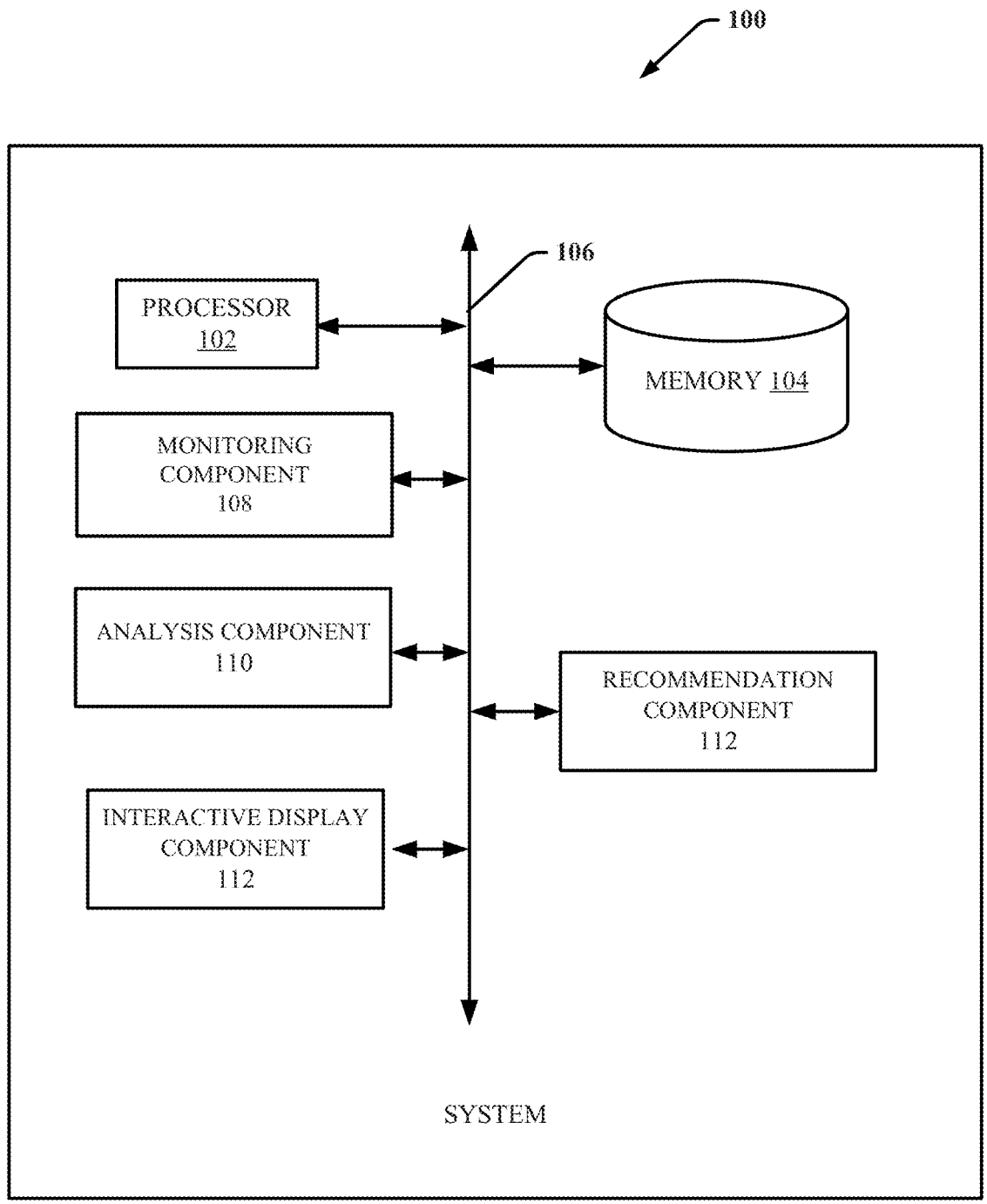
FIG. 1 illustrates a block diagram of an example, non-limiting system that facilitates driver assist interface in a vehicle in accordance with one or more embodiments described herein.

Turning now to the drawings, FIG. 1 illustrates a block diagram of an example, non-limiting system 100 that facilitates driver assist interface in a vehicle in accordance with one or more embodiments described herein. The system 100 includes a processor 102 that executes computer executable components stored in at least one memory 104. The system 100 can further include a system bus 106 that can couple various components, including, but not limited to, a monitoring component 108, an analysis component 110, a recommendation component 112 and an interactive display component 114. The monitoring component 108 monitors driver operation of a vehicle. The analysis component 110 analyzes the driver operation of the vehicle. The recommendation component 112 generates real-time recommendations regarding improving at least one of driver turning, accelerating or braking of the vehicle. The interactive display component 114 generates a real-time graphical user interface that visually represents the real-time recommendations relative to the driver's current operation of the vehicle.

In certain embodiments, the monitoring component 108 can monitor driver operation of a vehicle. For example, the monitoring component 108 can monitor how a driver uses driver controls in a vehicle such as a gas pedal, brake pedal, steering wheel and the like. The monitoring component 108 can also monitor how the vehicle is responding to the driver's user of driver controls. For example, as the driver uses the gas pedal, the monitoring component 108 can monitor how the driver's use of the gas pedal affects acceleration, deceleration or speed. As the driver uses the brake pedal, the monitoring component 108 can monitor how the driver's use of the brake pedal affects deceleration or speed. As the driver uses the steering wheel, the monitoring component 108 can monitor how the driver's use of the steering wheel affects the turn radius of the vehicle. The monitoring component 108 can also monitor how the vehicle responds when the driver is using one or more of the driver controls. For example, how the vehicle responds when the driver is using the steering wheel can depend in part on the speed of the vehicle and whether the vehicle is accelerating or decelerating.

It is to be appreciated that the monitoring component can receive information from a variety of devices and services, e.g., temperature sensor, accelerometers, global positioning system (GPS) devices/services, cameras, machine vision devices, pressure sensors, night vision devices, fuel sensors, engine sensors, humidity sensors, road condition sensors, eye and head position detectors, and the like. Any suitable device(s) or service(s) that can provide information in connection with functionality of the embodiments described herein are contemplated and intended to fall within the scope of the hereto appended claims.

In another example, the monitoring component 108 can also monitor how one or more systems, devices or components of the vehicle responds when the driver is using one or more of the driver controls. For example, the monitoring component 108 can monitor how the vehicle's engine responds to the driver's use of the gas pedal by monitoring revolutions per minute (RPMs). In another example, the monitoring component 108 can monitor how the speed of rotation of the vehicle's wheels responds to the driver's use of the brake pedal.

In another example, the monitoring component 108 can monitor how a driver's use a vehicle's settings or systems that can affect the driver's operation of the vehicle. For example, in some vehicles, a driver can select among driver modes that affect how the vehicle will respond to the use driver controls such as a gas pedal, brake pedal, steering wheel and the like. In some vehicles, a driver can select an "eco" mode or the like that can reduce throttle responsiveness, change gear ratios and reprogram climate controls to put less strain on the engine. In some vehicles, a driver can also select a "sport" mode or the like that can add weight to the steering, initiate a more aggressive throttle response, and remap its gear ratios so that the car will hold onto gears longer and maintain optimal torque performance and high RPMs. In another example, the driver can elect to disengage systems such as an anti-lock brake system or traction control system that can affect how the vehicle will respond to the use driver controls. In another example, the driver can engage a system such as a cruise control system that shifts one or more aspects of the operation of the vehicle to a system in the vehicle.

In another embodiment, the monitoring component 108 can identify the driver of the vehicle and log data associated with the driver's use of the vehicle. In one example, the monitoring component 108 can identify frequent drivers of a vehicle based upon profiles created by the monitoring component 108 of frequent drivers. For example, with respect to a vehicle used by a family, the monitoring component 108 can create profiles of each family member that drives the vehicle. In one example, information used by the monitoring component 108 to create profiles can be collected using questionnaires. In another example, the monitoring component 108 can utilize third party sources of information such as driver insurance data. Profiles of drivers can also be updated over time by logging a driver's history of using the vehicle. In another example, the monitoring component 108 can identify a frequent driver of the vehicle using a variety of factors. For example, the monitoring component 108 can identify a frequent driver using cameras and facial recognition systems. In another example, the monitoring component 108 can ask or confirm the identity of a driver using prompts in the vehicle's touch screen controls. In another example, the monitoring component 108 can identify a frequent driver by syncing with the driver's smartphone or other external user device. In another example, the monitoring component 108 can log and compile historical data associated with vehicle operation by different drivers.

In certain embodiments, the analysis component 110 can analyze driver operation of a vehicle. For example, the analysis component 110 can compare the driver operation of the vehicle determined by the monitoring component 108 to optimal driver operation based upon the location and movement of the vehicle in relation to roads, intersections, ramps and the like. In one example, if the driver is making a left turn at an intersection, the analysis component 110 can compare the turn radius of the vehicle based on the driver's use of the steering wheel to the optimal turn radius for the vehicle associated with the left turn in the intersection. The analysis component 110 can also compare the speed and acceleration or deceleration of the vehicle based on the driver's use of the gas pedal or brake pedal to the optimal speed for the vehicle for the left turn in the intersection. In another example, the analysis component 110 can also determine how the driver's progress through the left turn affects optimal operation of the vehicle through the rest of the turn. For example, if the driver doesn't turn the steering wheel enough at the beginning of the turn, thus creating a wider than optimal turn radius, then the driver will need to turn the steering wheel further to the left through the rest of the turn in order to complete the turn.

In another example, the analysis component 110 can utilize global positioning system (GPS) data to determine location and movement of the vehicle. The analysis component 110 can also utilize data from the vehicle's navigation system to determine the location and movement of the vehicle in relation to roads, intersections, ramps and the like. For example, if the driver is approaching a right turn associated with two perpendicular roads connecting at a 90-degree angle, the analysis component 110 can determine the optimal turn radius for the right turn. If the driver is approaching a right turn associated with two roads connecting at a 130-degree angle, the optimal turn radius for the right turn determined by the analysis component 110 will not be as sharp as the turn radius required for the roads connecting at a 90-degree angle.

In another example, the analysis component 110 can utilize the route generated by the vehicle's navigation system after a destination has been selected by the driver in order determine optimal operation of the vehicle. For example, if the vehicle is approaching an intersection on a road comprising two lanes in the direction that the vehicle is traveling, the driver will need to position the vehicle in the left lane if the route requires a left turn at the intersection and in the right lane if the route requires a right turn at the intersection.

In another example, the analysis component 110 can utilize data associated with traffic rules that apply to the vehicle's route in order determine optimal operation of the vehicle. For example, optimal speed determined by the analysis component 110 can be established at or below the applicable speed limit. In another example, optimal speed determined by the analysis component 110 can vary depending on location and the time of day. For examples, optimal speed will be lower in school zones at certain times of the day.

In another example, the analysis component 110 can take into account the type of vehicle or one or more features, systems, devices or components of the vehicle when determining optimal operation. For example, a sports car with a sport suspension can handle a tight curve on a curvy mountain road at a higher speed than a large sport utility vehicle. In this example, the driver of the sport utility vehicle should operate the vehicle at a lower speed than the driver of the sports car when driving through the tight curve.

The analysis component 110 can also utilize data received from systems and devices of the vehicle in determining optimal operation of the vehicle. For example, the analysis component 110 can utilize data received from machine vision systems and devices in order to detect traffic signals or the presence of pedestrians, cyclists, obstructions or other vehicles that can affect the optimal operation of the vehicle. In one example, the presence of one or more vehicles or pedestrians in an intersection will affect the determination of optimal operation of the vehicle. In another example, general traffic conditions surrounding the vehicle can affect optimal speed.

The analysis component 110 can utilize traffic information received wirelessly by the autonomous vehicle. For example, information associated with an accident on a selected route can be utilized by the analysis component 110 to determine that that the driver will need to slow down as the vehicle approaches the area of the accident. The analysis component 110 can determine that optimal top speed should be significantly lower than the speed limit in heavy traffic conditions.

The analysis component 110 can utilize information received wirelessly by the vehicle from other vehicles associated with location, movement and anticipated movement of each such other vehicle. For example, if a vehicle traveling in front of the driver's vehicle in the same direction transmits information to the driver's vehicle that the vehicle will be slowing down to make a right turn at the next intersection, the analysis component 110 can utilize such information to determine that the optimal operation of the vehicle will be to slow down or to change lanes as the vehicle in front of it slows down to make the turn depending on other factors such as proximity of other vehicles.

In yet another example, the analysis component 110 can utilize data received from devices such as sensors that identify road surface or road conditions. In one example, the analysis component 110 can determine that the driver should reduce speed on a gravel road. In another example, the analysis component 110 can determine that the driver should swerve to avoid a lard pothole or other road hazard depending on other factors such as the proximity of other vehicles.

The analysis component 110 can utilize data associated with weather. In one example, the analysis component 110 can utilize data received from devices in the vehicle such as sensors (e.g., thermometer, barometer, tire pressure, moisture, oil, debris or ice detectors, vehicle operation sensors . . . ) that identify real-time weather conditions. In addition, the analysis component 110 can determine the extent to which identified weather conditions can affect road conditions or optimal operation of the vehicle. For example, if the driver is traveling on a high-speed freeway and a rainstorm begins, the analysis component 110 can determine that the driver should reduce speed. In another example, the analysis component 110 can utilize data received wirelessly from services that provide real-time weather information or weather forecasts. For example, the analysis component 110 can determine that the driver can begin to resume normal speeds if weather data indicates that heavy rains will soon stop on the vehicle's current route.

The analysis component 110 can utilize data received from systems or devices in the vehicle that monitor the operation or required maintenance of systems, devices or components of the vehicle. For example, if the tire pressure of one or more tires of the vehicle falls below a certain threshold, the analysis component 110 can determine that the driver should reduce speed when making certain turns. In another example, maintenance status of the vehicle's engine can affect performance of the engine. In this example, the analysis component 110 can determine that the driver should apply more pressure to the gas pedal to achieve optimal speed or acceleration.

In yet another example, the analysis component 110 can utilize data received wirelessly from third party sources associated with events such as concerts, sporting events, festivals and the like that can affect optimal operation of the vehicle due to anticipated traffic.

In an embodiment, the analysis component 110 can utilize data received wirelessly from third party sources associated with road construction or maintenance. For example, speed limits are typically lowered on roads where construction or maintenance work is being performed.

In another embodiment, the analysis component 110 can utilize data received wirelessly from an external traffic coordination system in order to determine or infer next action of the vehicle. For example, the external traffic coordination system can coordinate the movement of multiple autonomous vehicles in a defined geographic area in order to optimize the movement of each autonomous vehicle in reaching its destination in the context of other vehicles. This information can be utilized by the analysis component 110 if the driver enters an area where autonomous vehicles are permitted.

In certain embodiments, the recommendation component 112 can generate real-time recommendations regarding improving at least one of driver turning, accelerating or braking of the vehicle. For example, the recommendation component 112 can recommend the extent to which the driver should turn the steering wheel in order to achieve the optimal turn radius determined by the analysis component 110 associated with a turn. In another example, the recommendation component 112 can recommend the extent to which the driver should apply pressure to the gas pedal to accelerate the vehicle in order to achieve the optimal acceleration and speed determined by the analysis component 110 associated with movements by the vehicle. In another example, the recommendation component 112 can recommend the extent to which the driver should apply pressure to the brake pedal in order to achieve the optimal braking determined by the analysis component 110 associated with slowing down or stopping. In each case, the recommendation component 112 can adjust the recommendations in real time as the monitoring component 108 monitors the extent to which the driver is reacting to the recommendations. For example, if the driver is not turning the steering wheel enough in order to achieve the optimal turn radius during a turn, the recommendation component 112 can continue to recommend increasing the extent of the turn of the steering wheel as the driver continues through the turn in order to assist the driver in completing the turn.

In another example, the recommendation component 112 can generate real-time recommendations regarding at least one of driver turning, accelerating or braking of the vehicle associated with the presence of pedestrians, cyclists, obstructions or other vehicles determined by the analysis component 110. For example, the recommendation component 112 can recommend that the driver swerve to the left and hit the brake pedal hard to order to avoid hitting an obstruction or a pedestrian. In another example, the recommendation component 112 can recommend that the driver accelerate quickly in to order to avoid hitting or being hit by another car approaching it from the side.

In another example, a recommendation generated by the recommendation component 112 can include additional information associated with the recommendation. For example, the recommendation can include information regarding the basis for the recommendation. For example, the recommendation component 112 can include information regarding the presence of a pothole or pedestrian with a recommendation to slow down. The recommendation can also include information associated with the urgency of the recommendation.

In another example, the recommendation component 112 can take into account vehicle maintenance history or scheduled maintenance for the vehicle when generating a recommendation. For example, if tires are scheduled to be replaced at the vehicle's next scheduled maintenance, then the recommendation component 112 can lower the recommended speed for the vehicle in certain turns where worn tire treads can potentially cause the vehicle to lose traction.

The recommendation component 112 can take into account driver preferences as determined by the monitoring component 108. For example, optimal operation of a vehicle can include a range of optimal results when applied to factors such as speed and acceleration. Some drivers will prefer to drive at higher speeds within an optimal range, particularly when time of arrival is important. Other drivers can prefer comfort and safety over speed and thus will prefer to drive at lower speeds within the optimal range. In this example, driver preferences can be established by the monitoring component 108 using questionnaires, user profiles and the like.

In another example, the recommendation component 112 can take into account the driver's selection of a driver mode using the vehicle settings. For example, if the driver has selected sport mode, the driver is indicating a preference for speed and performance and the recommendation component 112 can recommend the highest speeds that would be within the range of optimal operation of the vehicle. In another example, if the driver has selected eco mode, the driver is indicating a preference for fuel economy and the recommendation component 112 can generate recommendations regarding driver turning, accelerating or braking of the vehicle that would maximize fuel economy.

The recommendation component 112 can employ crowdsourcing to facilitate generating recommendations. For example, the recommendation component 112 can utilize information collected and shared by other vehicles such as traffic information, road conditions, road hazards, detours, weather information and the like. For example, if debris is spilled on a freeway and multiple vehicles have to adjust course to avoid hitting the debris, the vehicles can share the information which can then be transmitted to other vehicles.

In certain embodiments, the interactive display component 114 can generate generates a real-time graphical user interface that visually represents the real-time recommendations relative to the driver's current operation of the vehicle a real-time graphical user interface that visually represents the real-time recommendations relative to the driver's current operation of the vehicle. For example, the interactive display component 114 can visually represent the driver's current operation of the vehicle or recommendations relative to the driver's current operation of the vehicle using shapes such as a triangle, arrow, directional angle, curved angle or the like to indicate movement in a certain direction. If the shape is pointing upward on the graphical user interface it can visually represent the vehicle moving forward in substantially a straight direction. If the shape rotates to the left or right, the shape can represent a turn to the left or right respectively. One shape can visually represent the driver's current operation of the vehicle and will rotate left or right as the driver operates the vehicle and the vehicle changes direction.

A second shape can represent the real-time recommendations generated by the recommendation component 112 and will rotate left or right as the recommendations change in real time. The two shapes can be positioned relative to one another to visually represents the real-time recommendations relative to the driver's current operation of the vehicle. For example, a graphical representation of the driver's current operation of the vehicle can be overlaid onto a graphical representation of the recommended operation generated by the recommendation component 112. In one example, a shape such as triangle or an arrow can rotate left or right to indicate turns to the left or right, and the shape can be overlaid onto a substantially identical shape that can rotate to the left or right to indicate recommended turns to the left or right. In this example, the driver can see a visual representation in real time of how the driver's operation of the vehicle regarding turns and turn radius compares to recommendations generated by the recommendation component 112.

The driver can also see if and the degree to which the recommendation component 112 adjusts the recommendations in real time as the driver is reacting to the recommendations. For example, if the driver is not turning the steering wheel enough in order to achieve the optimal turn radius during a turn, the recommendation component 112 can continue to recommend increasing the extent of the turn of the steering wheel as the driver continues through the turn in order to assist the driver in completing the turn, and interactive display component 114 can visually represent the changing recommendation associated with turning the steering wheel in comparison to the driver's current operation of the vehicle in real time.

In certain embodiments, one or more shapes displayed by the interactive display component 114 can utilize color to visually represent the recommendation. For example, one or more shapes can change color to green to indicate a recommendation to accelerate and change color to red to indicate a recommendation to decelerate. In another example, the shade or brightness of the color can indicate the rate of acceleration or deceleration recommended. For example, a change to darker shade of green can indicate a recommendation to increase acceleration, and a change to a lighter shade of green can indicate a recommendation to reduce acceleration. In this example, as the driver increases acceleration to match the recommendation, the shade of green will lighten and then return to a default color as the driver matches the recommended acceleration. If the driver accelerates too quickly, the color will change to a shade of red to indicate a recommendation to decelerate. In another example, the shape used to visually represent turns associated with the driver's operation of the vehicle can change colors to visually represent recommended changes in acceleration, deceleration or speed.

In other embodiments, one or more shapes displayed by the interactive display component 114 can be morphable shapes. For example, the shapes representing the driver's current operation of the vehicle or recommendations relative to the driver's current operation of the vehicle can comprise curved arrows that bend and change shape the driver's current operation of the vehicle changes or recommendations relative to the driver's current operation of the vehicle change. In another example, the variable of speed can be represented by a shape morphing in length, with shorter length representing lower speed and longer length representing higher speed.

In embodiments, the interactive display component 114 can visually represent the recommendations generated by the recommendation component 112 relative to the driver's current operation of the vehicle as a heads-up display. For example, one or more shapes can be positioned in the heads-up display overlaid onto the view of the road ahead of the vehicle in the driver's line of sight. In this example, the driver can see real-time recommendations associated with a driver's operation of a vehicle relative to the driver's current operation of the vehicle without the need to glance towards a screen on the vehicle's dashboard.

The interactive display component 114 can visually represent the recommendations generated by the recommendation component 112 relative to the driver's current operation of the vehicle in an augmented realty environment. For example, one or more shapes can be overlaid onto the view of the road ahead of the vehicle in the driver's line of sight. In another example, shapes representing real-time recommendations associated with a driver's operation of the vehicle relative to the driver's current operation of the vehicle can remain in the driver's line of site as the head of the driver moves.

In another example, the interactive display component 114 can overlay text or images onto the field of vision of a driver of a vehicle to convey a recommendation. In one example, the interactive component 114 can highlight obstructions such as road hazards or pedestrians that can affect recommendations associated with a driver's operation of a vehicle. For example, the interactive display component 114 can highlight in a bright color a road hazard such as a pothole or a deer crossing the road. In one example, road hazards such as potholes or slippery portions of a road can be highlighted in one color such as red and moving obstructions such as pedestrian or bicyclists can be highlighted in another color such as yellow. In another example, the interactive display component 114 can overlay larger and brighter signs over street signs. For example, an approaching stop sign can be enhanced to be bigger and brighter to alert the driver that a recommendation to stop the vehicle is approaching.

Figure 2A:
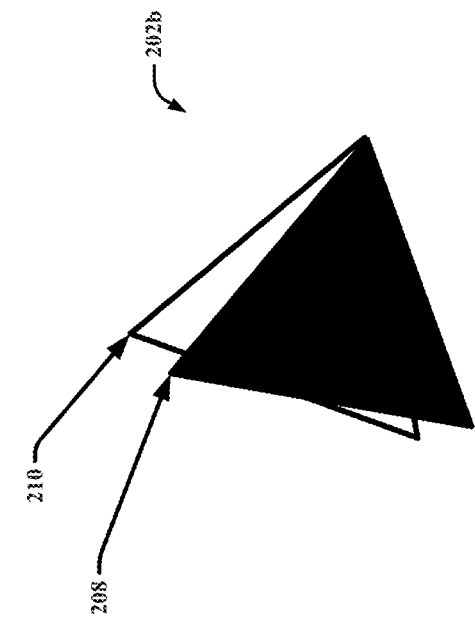
FIGS. 2A-2D respectively illustrate an example of a non-limiting system that facilitates driver assist interface in a vehicle in accordance with one or more embodiments described herein.
Figure 2B:
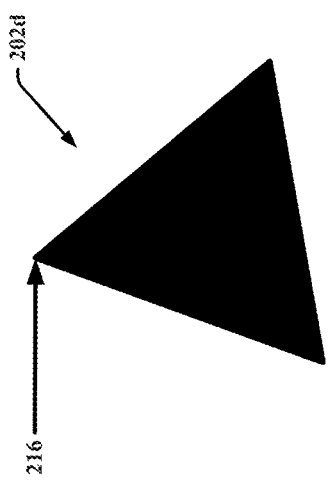

FIGS. 2A-2D respectively illustrate an example of a non-limiting system that facilitates driver assist interface in a vehicle in accordance with one or more embodiments described herein. Repetitive description of like elements employed in other embodiments described herein is omitted for sake of brevity. FIGS. 2A-2D depict examples of a graphical user interface generated by the interactive display component 114 comprising a graphical representation of the driver's current operation of the vehicle overlaid onto a graphical representation of the recommended operation generated by the recommendation component 112. FIG. 2A depicts two shapes 202a substantially in the form of two triangles. In this example, the first triangle 204 representing the driver's current operation of the vehicle is overlaid onto a second triangle 206 representing the recommended operation generated by the recommendation component 112. The direction of the top vertex of a triangle represents direction and turn radius of the vehicle's steering wheel. The triangle 206 is pointing upward and to the left, visually representing the degree of left turn recommended to the driver. The triangle 204 is pointing upward and further to the left, visually representing the degree of left turn the vehicle will take based on the driver's current operation of the steering wheel. In this example, the driver should be turning the steering wheel back towards the center position until the triangle 204 representing the driver's operation of the vehicle overlaps the triangle 206 representing the recommended operation of the vehicle. As the driver turns the steering wheel back towards the center position as recommended, the triangle 204 will rotate to the right to visually represent the turn of the steering wheel by the driver. FIG. 2B also depicts the two triangles 202*b* in positions pointing to the left, indicating a left turn. In this example, the driver's operation of the vehicle associated with turn radius for a left turn is closer to the recommended turn radius but still indicates a left turn that is sharper than recommended.

Figure 2C:
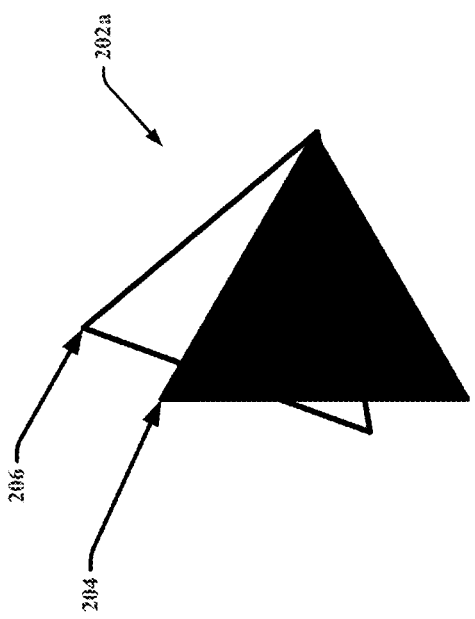
Figure 2D:
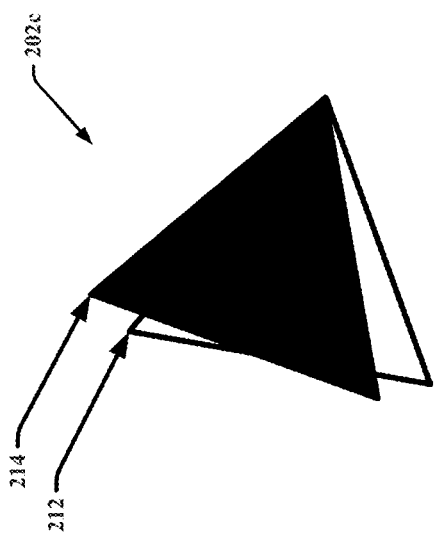

The triangle 208 visually represents the degree of left turn recommended to the driver and the triangle 210 represents the degree of left turn the vehicle will take based on the driver's current operation of the steering wheel. The driver will need to turn the steering wheel back towards the center position until the triangle 210 representing the driver's operation of the vehicle overlaps the triangle 208 representing the recommended operation of the vehicle, but to a lesser extent than depicted in FIG. 2A. FIG. 2C also depicts the two triangles 202*c* in positions pointing to the left, indicating a left turn. In this example, the recommended turn radius is sharper than the driver's current operation of the vehicle associated with turn radius for a left turn. The triangle 212 represents the degree of left turn recommended to the driver and the triangle 214 represents the degree of left turn the vehicle will take based on the driver's current operation of the steering wheel. The driver will need to turn the steering wheel further to the left until the triangle 212 representing the driver's operation of the vehicle overlaps the triangle 214 representing the recommended operation of the vehicle. In FIG. 2D, the two triangles 202*d* are depicted in a position pointing left with one triangle substantially overlapping the other. In this example, the triangle 216 represents the degree of left turn the vehicle will take based on the driver's current operation of the steering wheel. Because the triangle 216 substantially overlaps the other triangle which is now not visible, the degree of left turn the vehicle will take based on the driver's current operation of the steering wheel is substantially consistent with the degree of left turn recommended to the driver.

Figure 3:
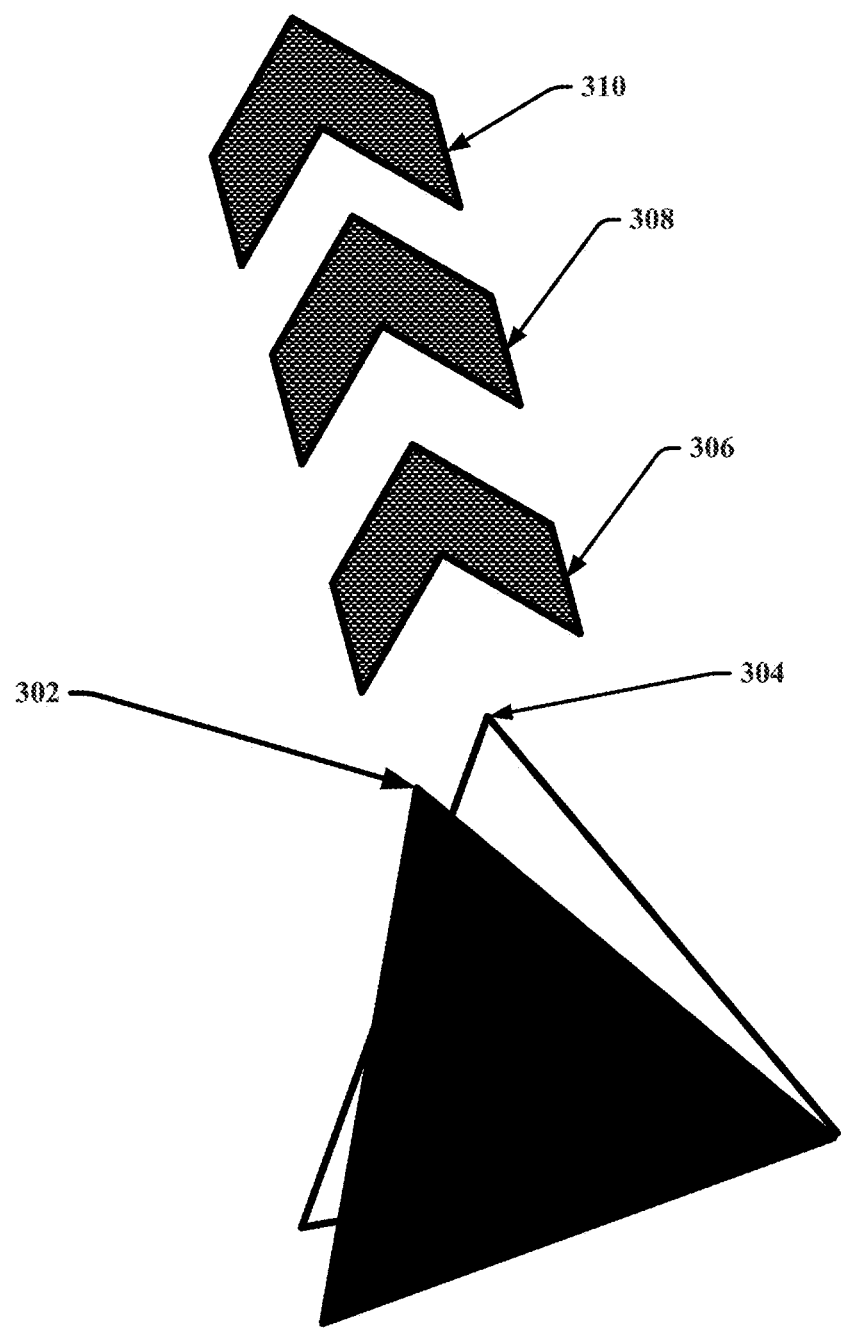
FIG. 3 illustrates another example of a non-limiting system that facilitates driver assist interface in a vehicle in accordance with one or more embodiments described herein.

FIG. 3 illustrates another example of a non-limiting system that facilitates driver assist interface in a vehicle in accordance with one or more embodiments described herein. Repetitive description of like elements employed in other embodiments described herein is omitted for sake of brevity. FIG. 3 depicts an example 302 of a graphical user interface generated by the interactive display component 114 comprising a graphical representation of the driver's current operation of the vehicle overlaid onto a graphical representation of the recommended operation generated by the recommendation component 112. FIG. 3 depicts two shapes substantially in the form of two triangles. In this example, the first triangle 302 representing the driver's current operation of the vehicle is overlaid onto a second triangle 304 representing the recommended operation generated by the recommendation component 112. The direction of the top vertex of a triangle represents direction and turn radius of the vehicle's steering wheel. The triangle 302 is pointing upward and to the left, visually representing the degree of left turn recommended to the driver. The triangle 304 is pointing upward and further to the left, visually representing the degree of left turn the vehicle will take based on the driver's current operation of the steering wheel. In this example, the driver should be turning the steering wheel back towards the center position until the triangle 304 representing the driver's operation of the vehicle overlaps the triangle 302 representing the recommended operation of the vehicle.

As the driver turns the steering wheel back towards the center position as recommended, the triangle 304 will rotate to the right to visually represent the turn of the steering wheel by the driver. Three directional angles 306, 308 and 310 are positioned above the triangle 302 and will rotate left to right to stay aligned with the direction of the top vertex of the triangle 302 recommending direction and turn angle to the driver. The directional angles 306, 308 and 310 will change color to represent recommended acceleration or deceleration, with green representing recommended acceleration and red representing recommended deceleration. The shade or brightness of the color will indicate the rate of acceleration or deceleration recommended. For example, a change to darker shade of green will indicate a recommendation to increase acceleration, and a change to a lighter shade of green will indicate a recommendation to reduce acceleration. As the driver increases acceleration to match the recommendation, the shade of green will lighten and then return to a default color as the driver matches the recommended acceleration. If the driver accelerates too quickly, the color will change to a shade of red to indicate a recommendation to decelerate.

In this example, the number of directional angles displayed in the graphical user interface indicates speed ranges. If only the first directional angle 306 is displayed, the speed recommendation is in the lowest range of 0-25 miles per hour (MPH). If only the first 306 and second 308 directional angles are displayed, the speed recommendation is in the intermediate range of 25-50 MPH. If the first 306, 308 and third 310 directional angles are displayed, the speed recommendation is in the highest range of 50 and over MPH. In this example, the driver can quickly observe recommendations regarding acceleration and deceleration along with speed by observing the color and shade of directional angles and the number of directional angles displayed. For example, if two directional angles 306 and 308 are displayed in a dark shade of green, the recommendation to the driver includes a recommendation to accelerate rapidly but not to exceed the speed range of 25-50 MPH.

Figure 4:
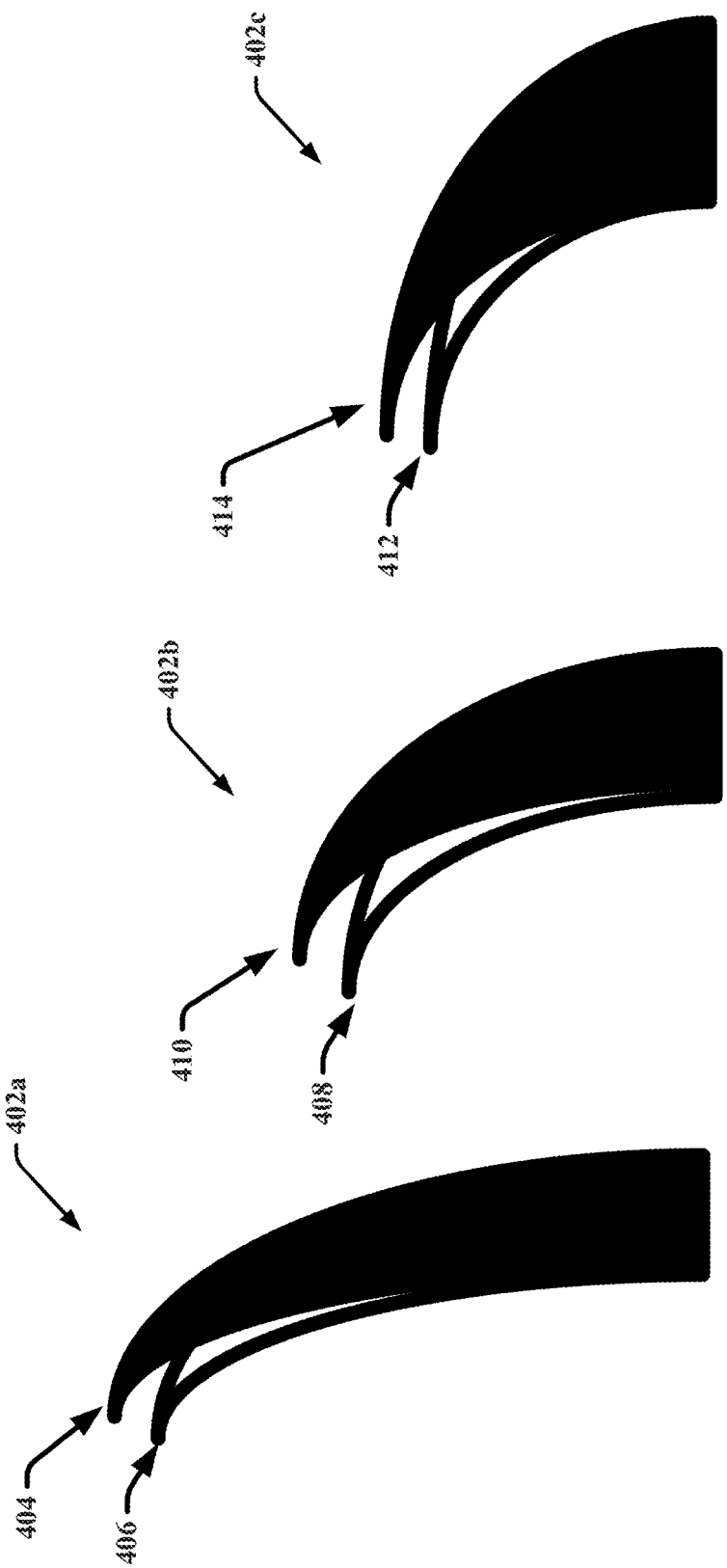
FIGS. 4A-4C respectively illustrate yet another example of a non-limiting system that facilitates driver assist interface in a vehicle in accordance with one or more embodiments described herein.

FIGS. 4A-4C respectively illustrate yet another example of a non-limiting system that facilitates driver assist interface in a vehicle in accordance with one or more embodiments described herein. Repetitive description of like elements employed in other embodiments described herein is omitted for sake of brevity. FIGS. 4A-4C depict examples of a graphical user interface generated by the interactive display component 114 comprising a graphical representation of the driver's current operation of the vehicle overlaid onto a graphical representation of the recommended operation generated by the recommendation component 112. In this example, the graphical representations comprise shapes in the form of curved directional angles that morph in shape to indicate direction, turn radius and speed. Direction and turn radius are represented by the direction and angle of the directional angle, and speed is represented by the length of the directional angle. Longer shapes represent faster speeds.

FIG. 4A depicts two shapes 402*a* substantially in the form of two curved directional angles. In this example, the first curved directional angle 404 representing the driver's current operation of the vehicle is overlaid onto a second curved directional angle 406 representing the recommended operation generated by the recommendation component 112. The curved directional angle 406 is pointing upward and to the left, visually representing the degree of left turn recommended to the driver. The curved directional angle 404 represents the degree of left turn the vehicle will take based on the driver's current operation of the steering wheel. In this example, the recommended turn radius is sharper than the driver's current operation of the vehicle associated with turn radius for a left turn. The driver will need to turn the steering wheel further to the left until the curved directional angle 404 representing the driver's operation of the vehicle morphs to overlap the curved directional angle 406 representing the recommended operation of the vehicle.

FIG. 4B also depicts the two curved directional angles 402b in positions pointing to the left, indicating progression of the left turn. In this example, the curved directional angle 408 representing the recommended operation has morphed to indicate a sharper turn radius than shape 406. The shape 408 has also morphed to be shorter than shape 406, indicating reduced recommended speed. Thus, the recommendation to the driver represented by the morphing of shape 406 into shape 408 comprises turning the steering wheel further to the left and reducing speed as the driver proceeds through the left turn. The curved directional angle 410 represents the driver's current operation of the vehicle as the driver continues through the left turn. The driver has slowed down and turned the steering wheel further to the left, but not to the extent recommended as represented by the curved directional angle 408.

FIG. 4C also depicts the two curved directional angles 402c in positions pointing to the left, indicating further progression of the left turn. In this example, the curved directional angle 412 representing the recommended operation has continued to morph to indicate a sharper turn radius as the driver proceeds through the left turn. The shape 412 has also continued to morph to be shorter than shape 408, indicating reduced recommended speed. Thus, the recommendation to the driver represented by the morphing of shape 408 into shape 412 comprises turning the steering wheel further to the left and reducing speed as the driver proceeds through the left turn. The curved directional angle 414 represents the driver's current operation of the vehicle as the driver continues through the left turn. The driver has continued to slow down and turn the steering wheel further to the left, but not to the extent recommended as represented by the curved directional angle 412.

Figure 5:
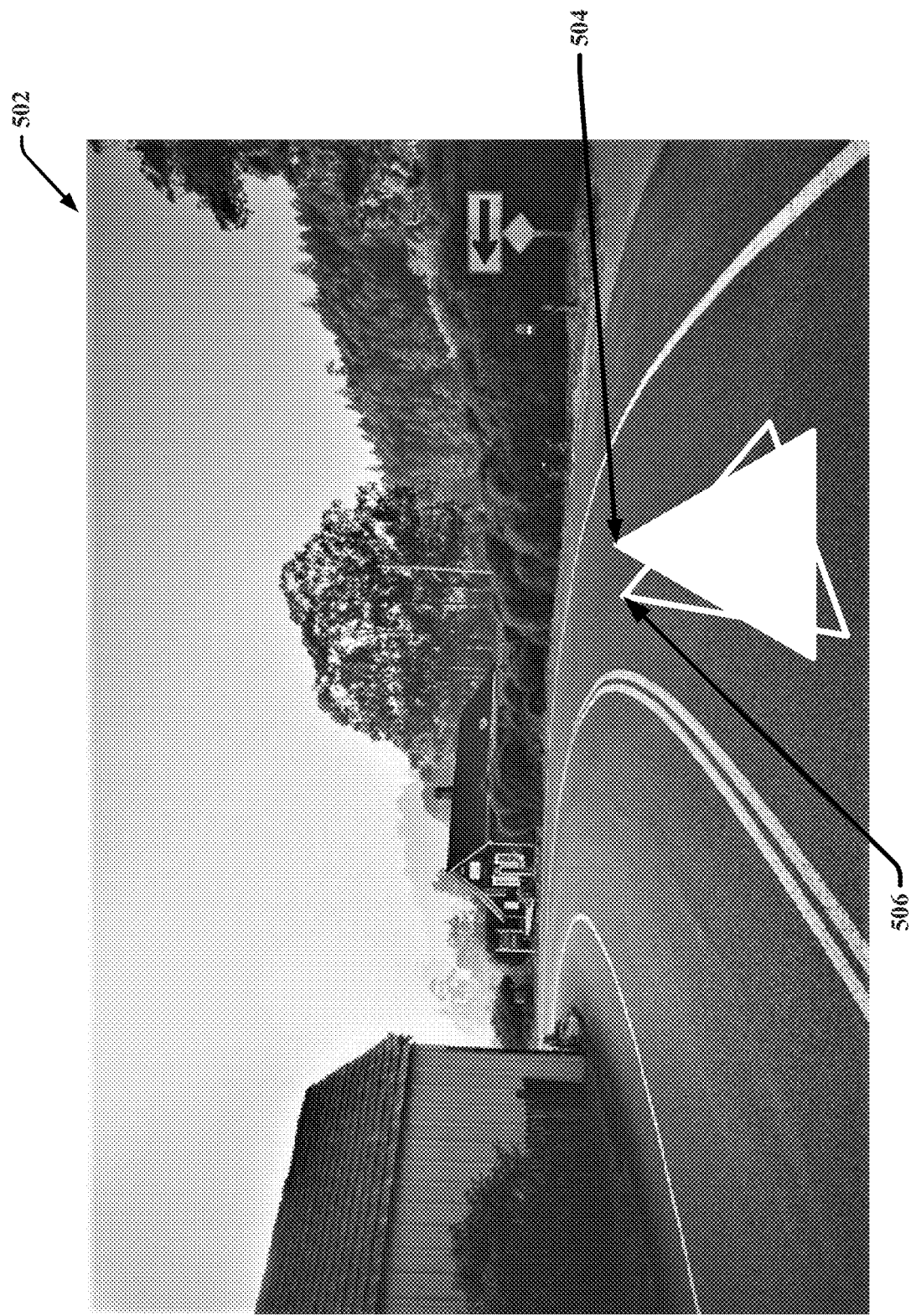
FIG. 5 illustrates yet another example of a non-limiting system that facilitates driver assist interface in a vehicle in accordance with one or more embodiments described herein.

FIG. 5 illustrates yet another example of a non-limiting system that facilitates driver assist interface in a vehicle in accordance with one or more embodiments described herein. Repetitive description of like elements employed in other embodiments described herein is omitted for sake of brevity. FIG. 5 depicts an example 502 of a graphical user interface generated by the interactive display component 114 comprising a graphical representation of the driver's current operation of the vehicle overlaid onto a graphical representation of the recommended operation generated by the recommendation component 112. In this example, the image 502 of a road curving to the left represents the view of a driver in a vehicle. A graphical representation of the driver's current operation of the vehicle overlaid onto a graphical representation of the recommended operation in a heads-up display. In this example, the first triangle 504 representing the driver's current operation of the vehicle is overlaid onto a second triangle 506 representing the recommended operation generated by the recommendation component 112. The direction of the top vertex of a triangle represents direction and turn radius of the vehicle's steering wheel. The triangle 506 is pointing upward and to the left, visually representing the degree of left turn recommended to the driver. The triangle 504 is pointing upward, indicating that the driver has not begun to turn the steering wheel to the left to initiate the recommended left turn. Using the heads-up display, the driver can see the upcoming turn in the road along with a graphical representation of the driver's current operation of the vehicle overlaid onto a graphical representation of the recommended operation in his line of site. As the driver turns the steering wheel to the left as recommended, the triangle 504 will rotate to the left to visually represent the turn of the steering wheel by the driver.

Figure 6:
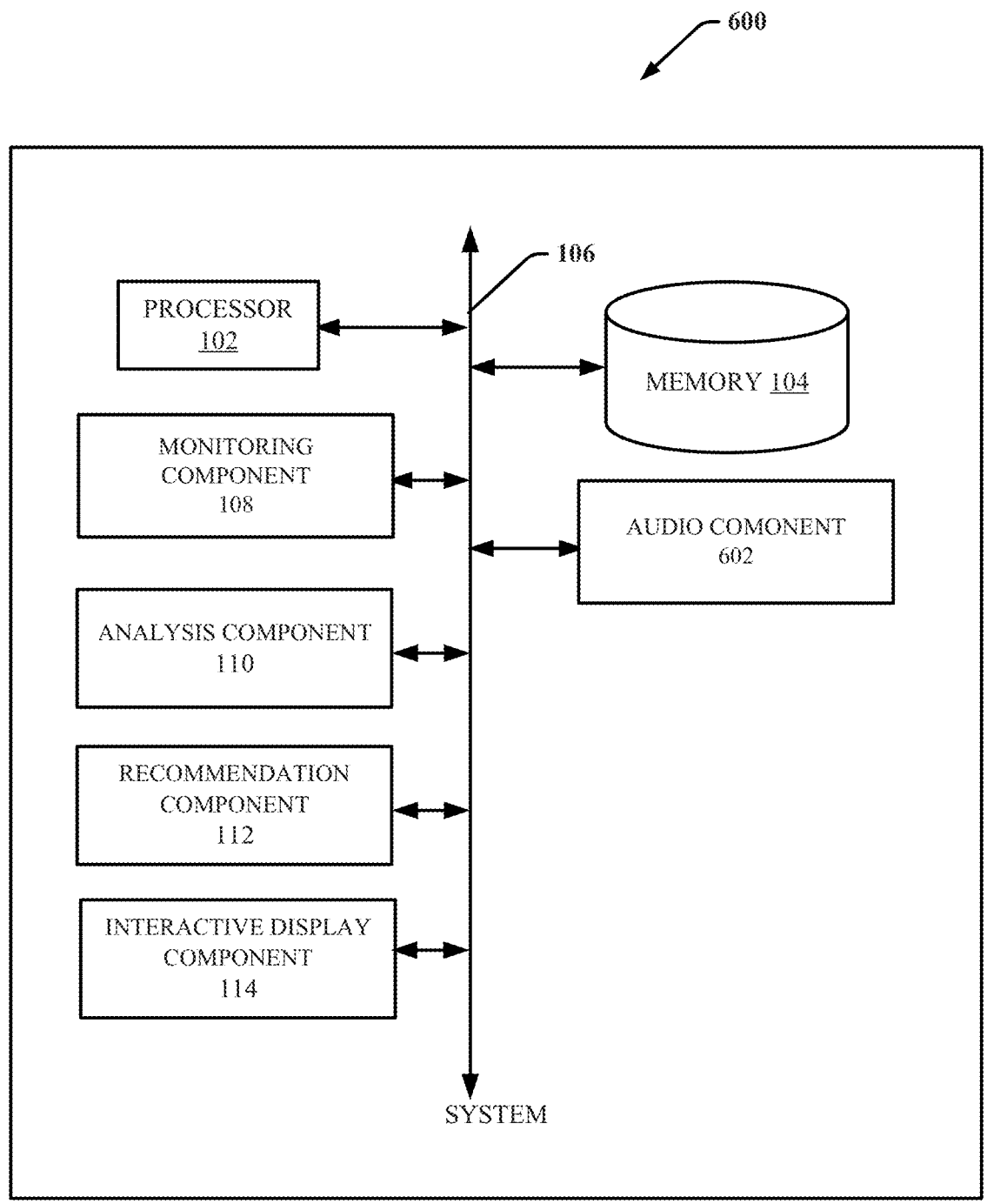
FIG. 6 illustrates a block diagram of another example, non-limiting system that facilitates driver assist interface in a vehicle in accordance with one or more embodiments described herein.

FIG. 6 illustrates a block diagram of another example, non-limiting system that facilitates driver assist interface in a vehicle in accordance with one or more embodiments described herein. Repetitive description of like elements employed in other embodiments described herein is omitted for sake of brevity. In certain embodiments, the system 600 includes an audio component 602 that can generate audio instructions associated with the recommendations. For example, the audio component 602 can generate audio notifications of each recommendation conveyed by the interactive display component 114. In one example, the audio component 602 that can generate audio notifications of certain types of recommendations conveyed by the interactive display component 114. In this example, the driver can determine which types of recommendations will generate an audio notification. For example, the audio component 602 can include settings that can be selected by a driver that will cause audio notifications to be generated by the audio component 602 only for a recommendation that includes a sudden movement such as a sudden, sharp turn or sudden braking to avoid an obstruction. In another example, a driver can select that audio notifications to be generated by the audio component 602 only for a recommendation associated with turn radius.

In another embodiment, the audio component 602 can take the form of a computer-generated voice notice or one or more sounds corresponding to certain notices. The audio component 602 can include settings that enable the driver or a passenger to adjust the audio notifications for characteristics such as language, volume, voice type, sound type and the like.

In another embodiment, the audio component 602 can generate audio notifications that can supplement recommendations conveyed by the interactive display component 114. For example, the audio component 602 can generate audio notifications that explain why certain recommendations are conveyed such as weather or traffic conditions. For example, if the interactive display component 114 conveys a recommendation that the driver should slow down, the audio component 602 can indicate that heavy traffic is up ahead.

Figure 7:
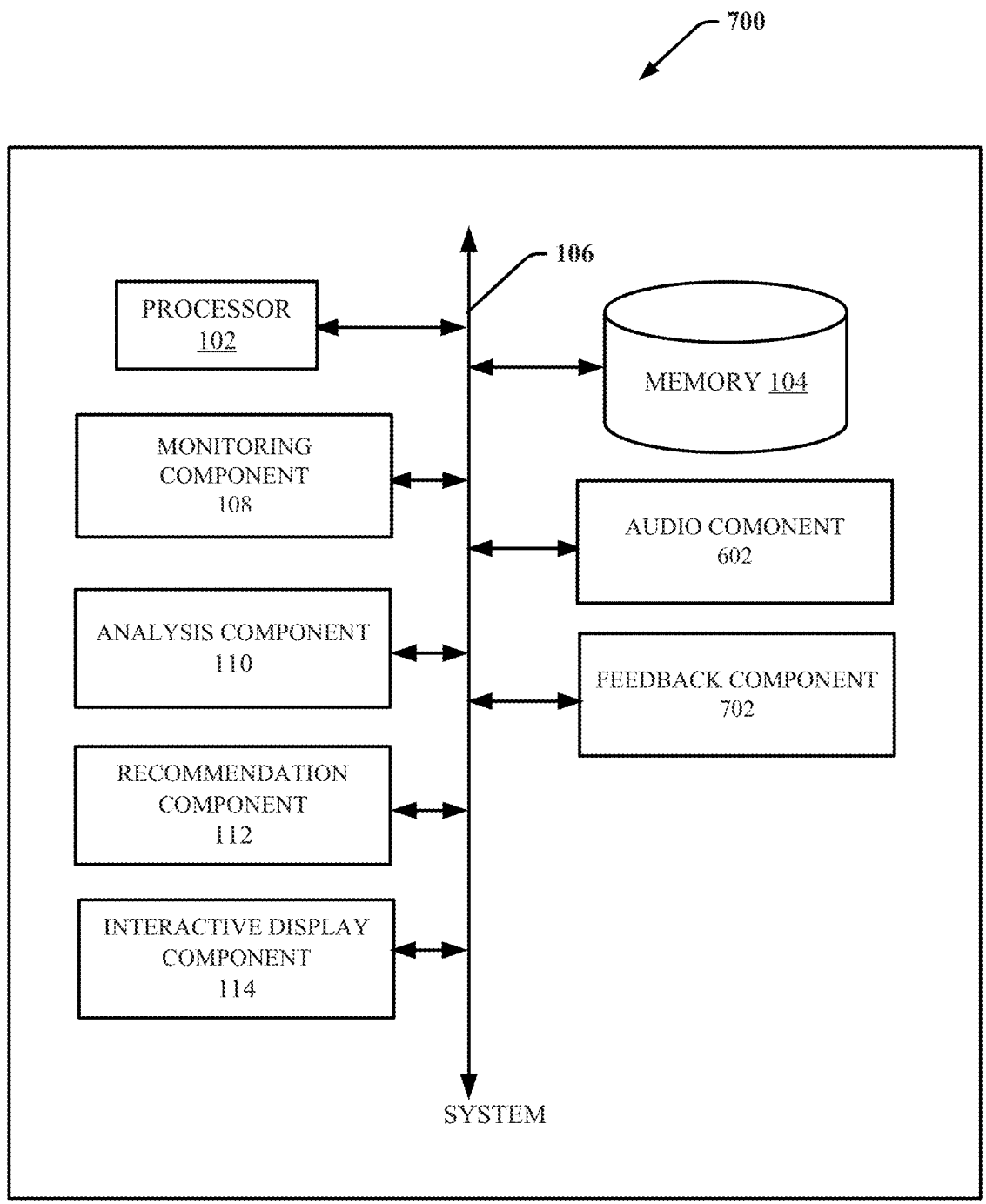
FIG. 7 illustrates a block diagram of yet another example, non-limiting system that facilitates driver assist interface in a vehicle in accordance with one or more embodiments described herein.

FIG. 7 illustrates a block diagram of yet another example, non-limiting system that facilitates driver assist interface in a vehicle in accordance with one or more embodiments described herein. Repetitive description of like elements employed in other embodiments described herein is omitted for sake of brevity. In certain embodiments, the system 700 includes a feedback component 702 that can generate an assessment of a driver's prior operation of the vehicle in relation to the recommendations generated by the recommendation component 112. For example, the assessment generated by the feedback component 702 can convey to the driver that the driver often exceeds the speed limit on certain types of roads. In another example, the assessment generated by the feedback component 702 can convey to the driver that the driver often exceeds optimal speed when taking right turns. In another example, the assessment generated by the feedback component 702 can convey to the driver that the driver often turns too sharply when making certain types of left turns. In another example, the assessment of a driver's prior operation of the vehicle can apply to one or more trips taken by the driver in the vehicle or to the driver's entire history of operating the vehicle logged by the monitoring component 108.

In another example, the assessment generated by the feedback component 702 can be conveyed in real time to the driver or can be delivered to the driver at a later time.

In certain embodiments, the assessment generated by the feedback component 702 can be conveyed in the form of one or more scores assigned to the driver's operation of the vehicle. In one example, the driver's scores can be compared to standards associated with safe operation of the vehicle. In another example, the driver's scores can be compared to average scores or rankings determined using crowdsourced data associated with similar drivers or vehicles.

In certain embodiments, the feedback component 702 can generate a video convey the assessment to the driver that can be played back by the driver. In one example, the video can compare the driver's operation of the vehicle to the recommended operation of the vehicle associated with one or more actions taken by the driver.

In certain embodiments, the feedback component 702 can provide feedback to the driver in real time associated with certain operations of the vehicle. For example, the instruction component 702 can provide audio feedback to the driver utilizing the audio component 602. For example, the feedback component 802 can provide feedback to the driver that a recommended operation has been completed properly. In another example, the feedback component 802 can provide feedback to the driver that the driver is traveling to fast through turns.

In certain embodiments, the feedback component 702 can integrate the system 700 with other visualization tools. For example, the system 700 can be integrated into a wireless mobile device such as a smartphone, tablet computer or the like in order to display the assessments.

Figure 8:
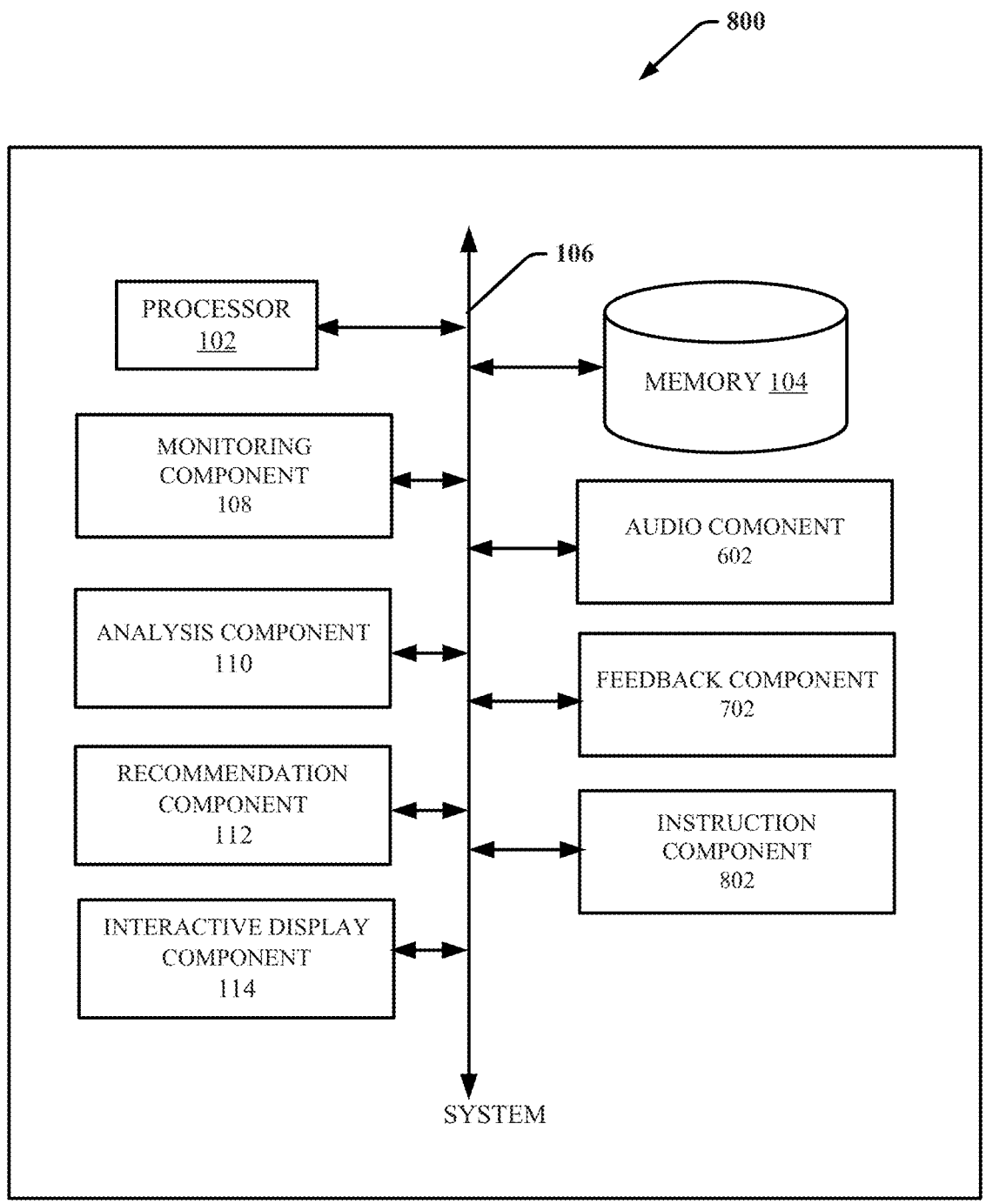
FIG. 8 illustrates a block diagram of yet another example, non-limiting system that facilitates driver assist interface in a vehicle in accordance with one or more embodiments described herein.

FIG. 8 illustrates a block diagram of another example, non-limiting system that facilitates driver assist interface in a vehicle in accordance with one or more embodiments described herein. Repetitive description of like elements employed in other embodiments described herein is omitted for sake of brevity. In certain embodiments, the system 800 includes an instruction component 802 that can generate instructions on how the driver can improve the driver's operation of the vehicle in the future. For example, the instruction component 802 can provide instructions to the driver associated with certain operations of the vehicle. If the driver often begins turning the steering wheel too soon during left turns, the instruction component 802 can provide instruction associated with when to begin a turn to achieve recommended turn radius. In another example, the instruction component 802 can provide instructions to the driver associated with safety considerations that affect recommendation operation of the vehicle. For example, the instruction component 802 can provide instruction associated with how to avoid blind spots of other drivers.

In certain embodiments, the instruction component 802 can generate a video convey the instructions to the driver that can be played back by the driver. For example, the instruction component 802 can generate a video highlighting patterns of vehicle operation that the driver can improve. For example, the instruction component 802 can generate a video highlighting instances where the driver failed to keep a safe distance behind another vehicle.

In certain embodiments, the instruction component 802 can provide instructions to the driver in real time associated with certain operations of the vehicle. For example, the instruction component 802 can provide audio instructions to the driver utilizing the audio component 602. For example, the instruction component 802 can provide audio instructions to the driver to pay attention to starting a left turn at the proper time as the driver approaches a right turn. The instruction component 802 can integrate the system 800 with other visualization tools. For example, the system 800 can be integrated into a wireless mobile device such as a smartphone, tablet computer or the like in order to display the instructions.

In certain embodiments, the instruction component 802 can tailor instructions to the experience level of the driver. For example, instructions generated for an inexperienced driver can emphasize habits that new drivers should learn such as complying with speed limits, keeping a safe distance and avoiding the blind spot of other drivers.

Figure 9:
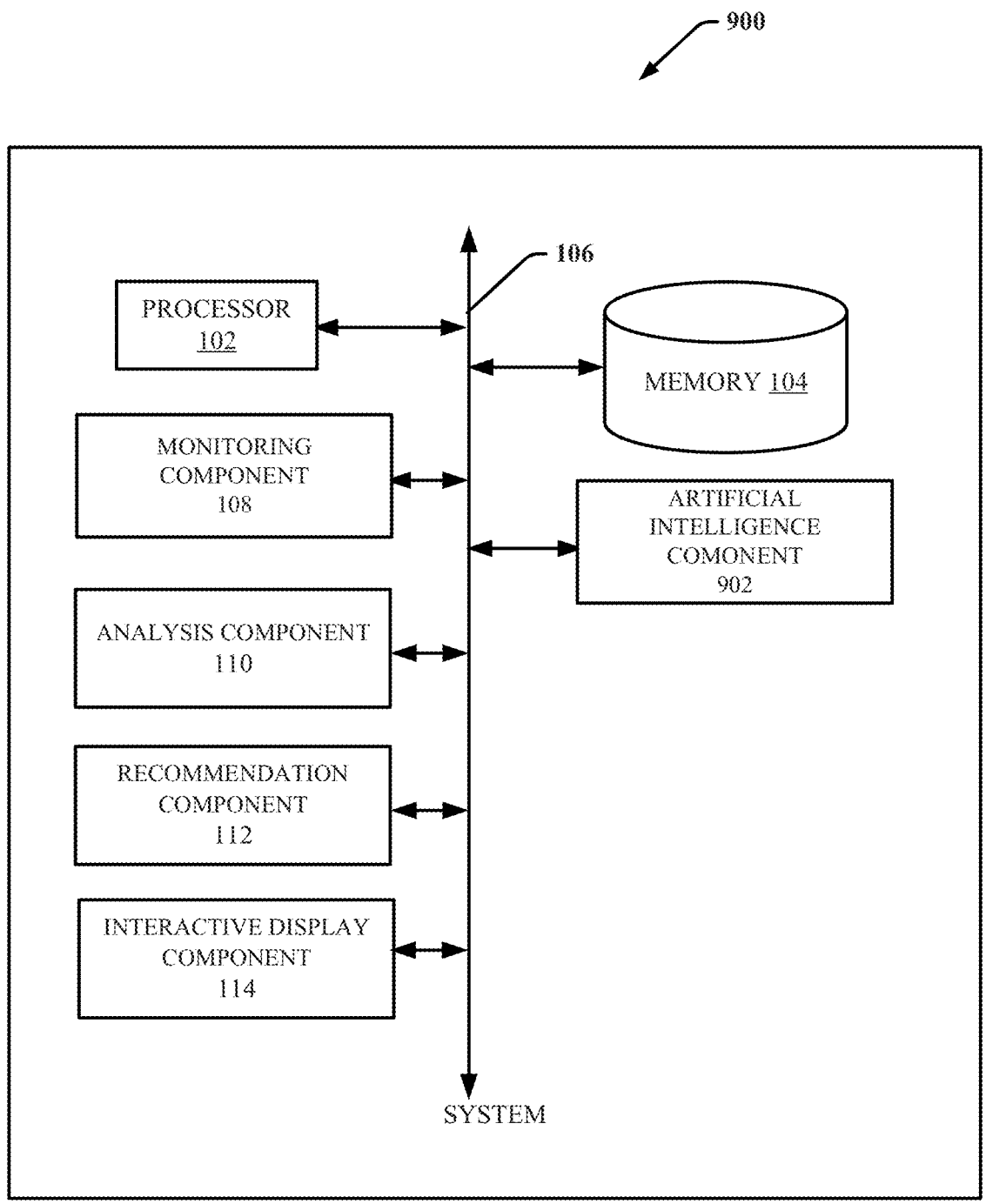
FIG. 9 illustrates a block diagram of yet another example, non-limiting system that facilitates driver assist interface in a vehicle in accordance with one or more embodiments described herein.

FIG. 9 illustrates a block diagram of another example, non-limiting system that facilitates driver assist interface in a vehicle in accordance with one or more embodiments described herein. Repetitive description of like elements employed in other embodiments described herein is omitted for sake of brevity. In certain embodiments, the system 900 includes an artificial intelligence component 902 that facilitates the generation of recommendations by the recommendation component 112. For example, the artificial intelligence component 902 can detect patterns associated with a driver's operation of a vehicle that can facilitates the generation of recommendations. For example, the artificial intelligence component 902 can detect a pattern that the driver often brakes too late when approaching a stop light or stop sign. In this example, the artificial intelligence component 902 can train the recommendation component 112 to recommend a reduction in speed for the driver when the driver approaches a stop light or stop sign at a point prior to when such a recommendation is typically conveyed under these circumstances.

In another example, the artificial intelligence component 902 can detect patterns associated with data collected by the analysis component 110. For example, the artificial intelligence component 902 can detect traffic patterns associated with the driver's daily commute to and from work. In another example, the artificial intelligence component 902 can detect a pattern that deer are often present at certain times of the day on or near a road travelled often by the driver. In this example, the artificial intelligence component 902 can train the recommendation component 112 to recommend a reduction in speed for the driver when the driver travels the road at those times.

The artificial intelligence component 902 can detect patterns associated with how the vehicle operates under certain conditions. For example, the artificial intelligence component 902 can detect a pattern that a vehicle's traction control system is less effective when the weight of the vehicle associated with passengers and cargo exceeds a certain weight. In this example, the artificial intelligence component 902 can train the recommendation component 112 to take turns more slowly when certain weight thresholds are exceeded.

In another example, the artificial intelligence component 902 can employ crowdsourcing to facilitate the generation of recommendations by the recommendation component 112. For example, the artificial intelligence component 902 can utilize data associated with how similar vehicles operate in certain conditions and detect patterns that can facilitate the generation of recommendations. In one example, the artificial intelligence component 902 can determine the optimal speed for the vehicle on certain curvy, mountain roads based upon data compiled from similar vehicles that have traveled such roads.

In this regard, the artificial intelligence component 902 can perform classifications, correlations, inferences and/or expressions associated with principles of artificial intelligence. For instance, the artificial intelligence component 902 can employ an automatic classification system and/or an automatic classification. In one example, the artificial intelligence component 902 can employ a probabilistic and/or statistical-based analysis (e.g., factoring into the analysis utilities and costs) to learn and/or generate inferences. The artificial intelligence component 902 can employ any suitable machine-learning based techniques, statistical-based techniques and/or probabilistic-based techniques. For example, the artificial intelligence component 902 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 902 can perform a set of machine learning computations. For example, the artificial intelligence component 902 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 10:
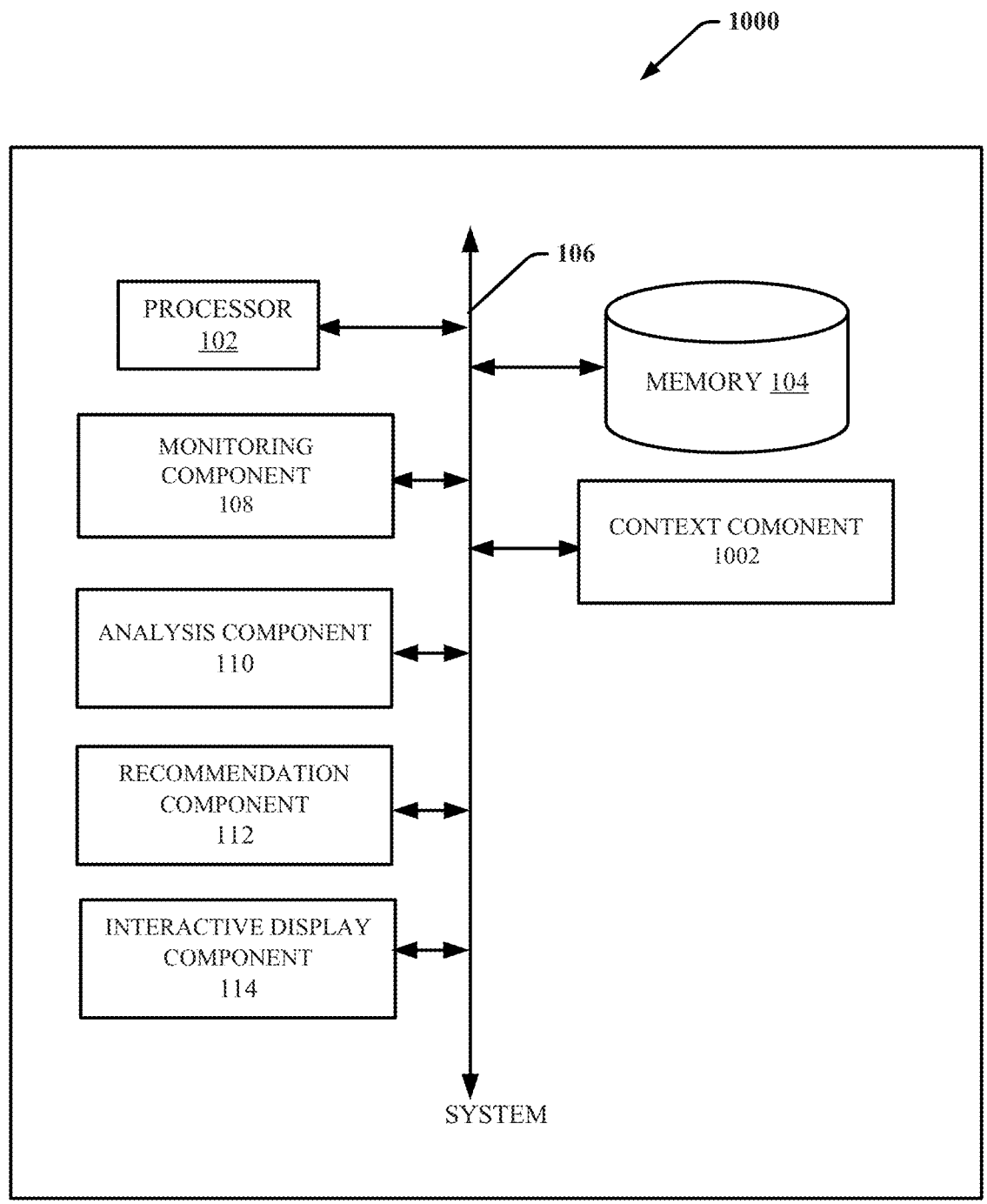
FIG. 10 illustrates a block diagram of yet another example, non-limiting system that facilitates driver assist interface in a vehicle in accordance with one or more embodiments described herein.

FIG. 10 illustrates a block diagram of another example, non-limiting system that facilitates driver assist interface in a vehicle in accordance with one or more embodiments described herein. Repetitive description of like elements employed in other embodiments described herein is omitted for sake of brevity. In certain embodiments, the system 1000 includes a context component 1002 that can monitor vehicle or driver context. For example, the context component 1002 can determine preferences of a driver or one or more passengers that can be utilized by the recommendation component 112 to generate recommendations. For example, the context component 1002 can determine if the driver or one or more passengers has a preference for speed over comfort. A driver traveling to an important business meeting can have a preference for arriving on time over the comfort of the trip. In this example, the recommendation component 112 can recommend the highest speeds that would constitute optimal operation of the vehicle during the trip.

In certain embodiments, the context component 1002 can monitor the demographics of the driver or one or more passengers. For example, the context component 1002 can determine if the driver is an inexperienced teenager. In this example, the recommendation component 112 can recommend lower speeds and longer braking times to account for the inexperience of the driver. In another example, the context component 802 can determine if a driver is accompanied by one or more young children in car seats. In this example, the recommendation component 112 can recommend lower speeds and longer braking times to account for the increased likelihood that the driver will be distracted.

In certain embodiments, the context component 1002 can monitor the driver is distracted or fatigued while driving the vehicle. For example, the context component 1002 can utilize cameras in the vehicle to monitor the driver's eyes to detect when the driver isn't watching the road ahead.

In certain embodiments, the context component 1002 can monitor the types of vehicles within a certain distance of the vehicle to determine or infer vehicle or driver context. For example, if the context component 1002 determines that a police car with lights flashing has pulled over another vehicle on the right side of a freeway approximately one mile down the road from the vehicle, the context component 1002 can determine or infer that vehicles in front of and behind the vehicle will be moving to the left lane of the freeway. In this example, the recommendation component 112 can generate a recommendation that the driver should move to the left lane. In another example, if the context component 1002 determines that an ambulance with lights flashing and sirens blaring is approaching the general vicinity of the vehicle, the context component 1002 can determine or infer that traffic the general vicinity of the vehicle will begin to slow down and other vehicles will begin to stop and pull to the side of the road. In another example, if the context component 1002 begins to identify a large number of motorcycles or bicycles moving near the vehicle, the context component 1002 can infer that the driver will experience an increased blind spot risk given the large number of motorcycles or bicycles in the vicinity of the vehicle.

In certain embodiments, the context component 1002 take into account the needs of certain professions and recreational activities when monitoring vehicle or driver context. For example, drivers of a police car or ambulance can be required to exceed the speed limit and operate a vehicle in a manner that would be prohibited for other drivers. In this example, the context component 1002 can cause the recommendation component 112 to tailor recommendations to the context of the vehicle and the driver. If the driver of a police car is involved in a high speed chase or the driver of an ambulance is involved in an emergency, the recommendation component 112 can generate recommendations that include speeds over the speed limit and can take into account such higher speeds when recommending turn radius in turns. In another example, drivers on a racetrack or on a private, recreational route are not restricted by speed limits or other traffic rules. In this example, the context component 1002 can cause the recommendation component 112 to tailor recommendations to maximize performance of the vehicle in the applicable context.

Figure 11:
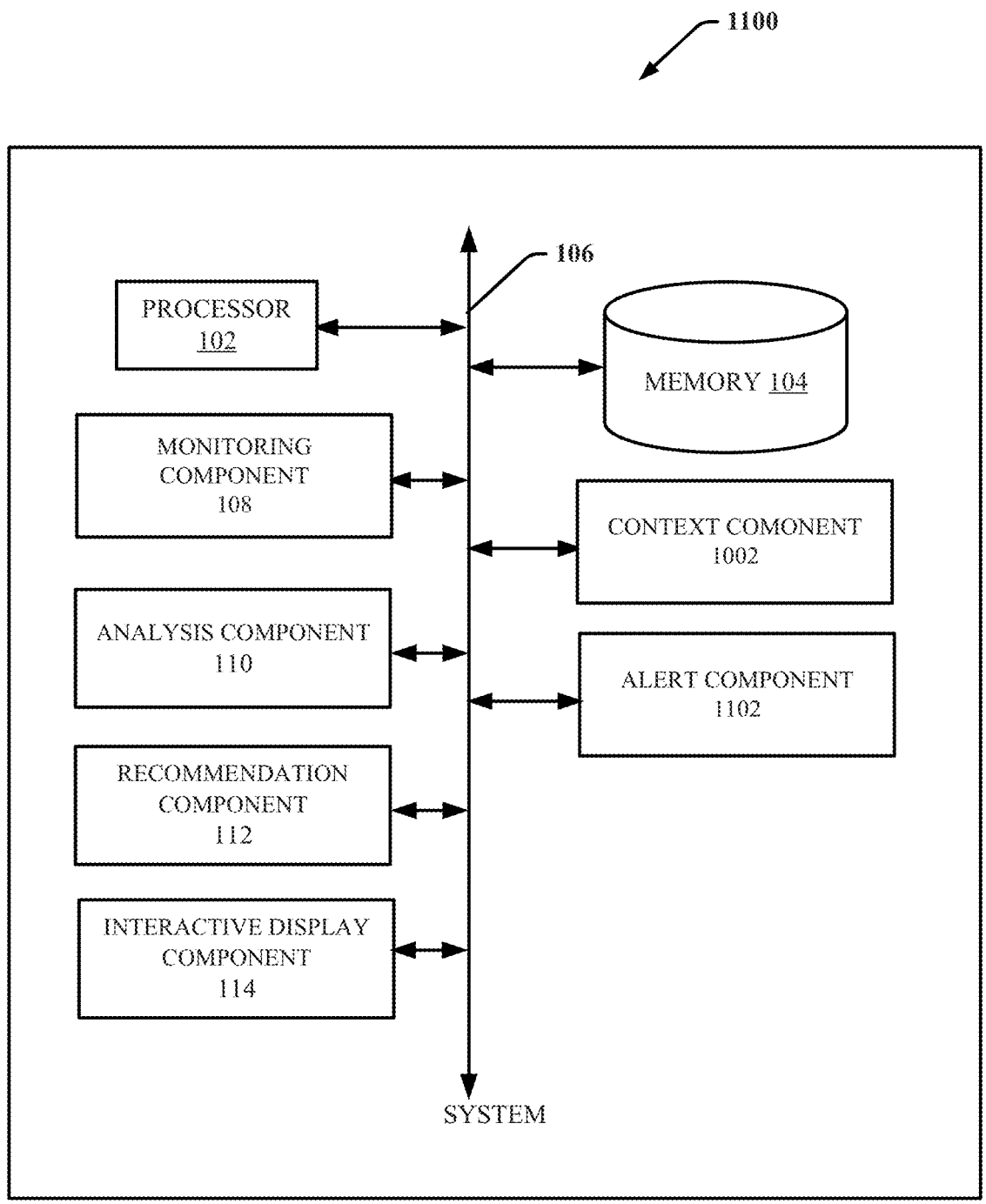
FIG. 11 illustrates a block diagram of yet another example, non-limiting system that facilitates driver assist interface in a vehicle in accordance with one or more embodiments described herein.

FIG. 11 illustrates a block diagram of another example, non-limiting system that facilitates driver assist interface in a vehicle in accordance with one or more embodiments described herein. Repetitive description of like elements employed in other embodiments described herein is omitted for sake of brevity. In certain embodiments, the system 1100 includes an alert component 1102 that can generate alerts for the driver, and perform a risk assessment that factors safety in light of vehicle or driver context determined by the context component 1002. For example, if the context component 1002 determines that the driver is distracted, the alert component 1102 can alert the driver to keep the driver's eyes on the road. In another example, if the driver consistently fails to keep a safe distance behind another vehicle, the alert component 1102 can alert the driver that the driver should reduce the speed of the vehicle to establish safe distance. In another example, if the context component 1002 determines that a large number of bicycles are moving near the vehicle, the alert component 1102 can alert the driver to pay attention to bicycles near the vehicle and reduce speed.

In certain embodiments, the alert component 1102 can tailor alerts to the experience level of the driver. For example, the risk assessment conducted by the alert component 1102 that factors safety in light of vehicle or driver context can take into account whether a driver is a young, inexperienced driver or an older, experience driver. In this example, younger and less experienced drivers will receive more alerts.

Figure 12:
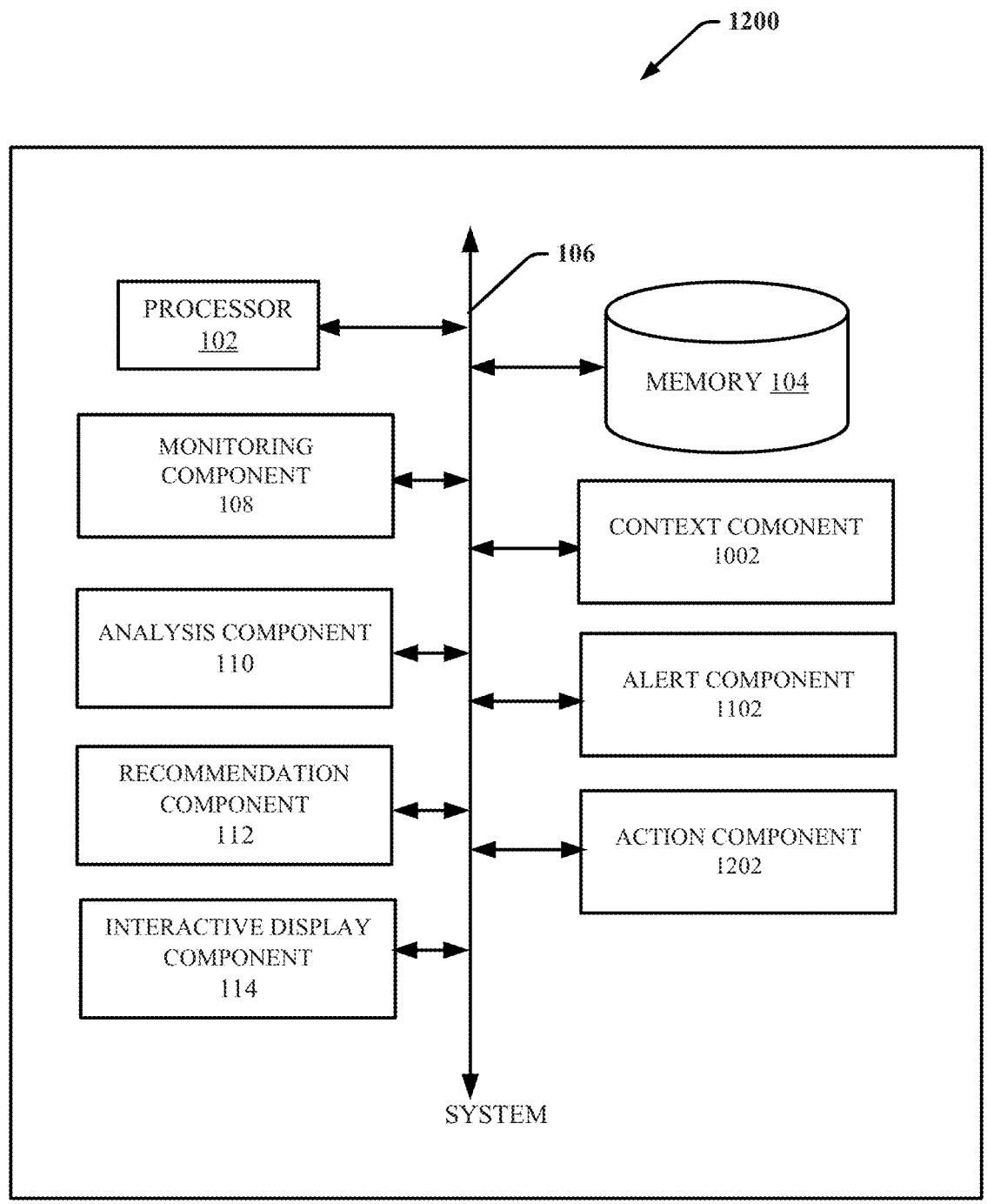
FIG. 12 illustrates a block diagram of yet another example, non-limiting system that facilitates driver assist interface in a vehicle in accordance with one or more embodiments described herein.

FIG. 12 illustrates a block diagram of another example, non-limiting system that facilitates driver assist interface in a vehicle in accordance with one or more embodiments described herein. Repetitive description of like elements employed in other embodiments described herein is omitted for sake of brevity. In certain embodiments, the system 1200 includes an action component 1202 that can take automated action associated with control or operation of the vehicle based on an action recommended in the alert generated by the alert component 1102. For example, if the alert component 1102 alerts the driver that the driver is not keeping a safe distance behind another vehicle, the action component 1202 can reduce the speed of the vehicle until a safe distance has been established. In another example, if the alert component 1102 alerts the driver to keep the driver's eyes on the road, the action component 1202 can apply the brakes to reduce the speed of the vehicle.

In certain embodiments, the action component 1202 can adapt when certain actions are taken to the experience level of the driver. For example, if the driver is very experienced, the action component 1202 can limit taking action only to situations that involve a higher threshold of safety risk.

In certain embodiments, the action component 1202 can take immediate action at the time the alert component 1102 determines with a risk assessment that immediate action is required. For example, the action component 1202 can apply the brakes to avoid a collision with another vehicle or swerve to avoid a pedestrian.

Figure 13:
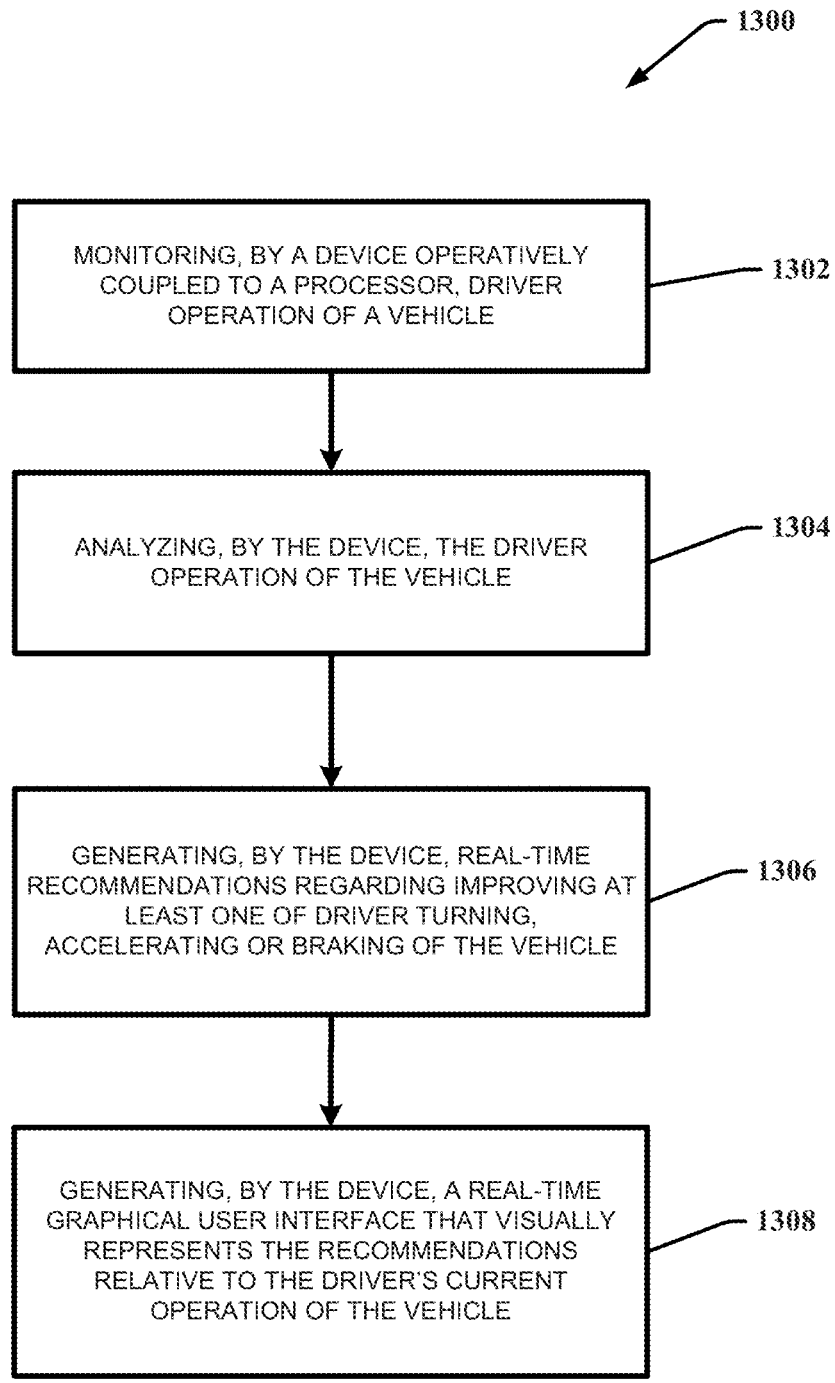
FIG. 13 illustrates a flow diagram of an example of a method to facilitate driver assist interface in a vehicle in accordance with one or more embodiments described herein.

FIG. 13 illustrates a flow diagram of an example of a method to facilitate driver assist interface in a vehicle in accordance with one or more embodiments described herein. Repetitive description of like elements employed in other embodiments described herein is omitted for sake of brevity. 1302 represents a first act that includes monitoring of driver operation of a vehicle (e.g., via the monitoring component 108). At 1304, driver operation of the vehicle is analyzed (via the analysis component 110). At 1306, real-time recommendations regarding improving at least one of driver turning, accelerating or braking of the vehicle are generated (e.g., via the recommendation component 112). At 1308, a real-time graphical user interface that visually represents the recommendations relative to the driver's current operation of the vehicle is generated. (e.g., via the interactive display component 114).

In certain embodiments, at 1308, the graphical user interface generated by the interactive display component 114 comprises a graphical representation of the driver's current operation of the vehicle overlaid onto a graphical representation of the recommended operation generated by the recommendation component 112. In another embodiment, at 1308, the interactive display component 114 visually represents the recommendations relative to the driver's current operation of the vehicle in an augmented realty environment.

Figure 14:
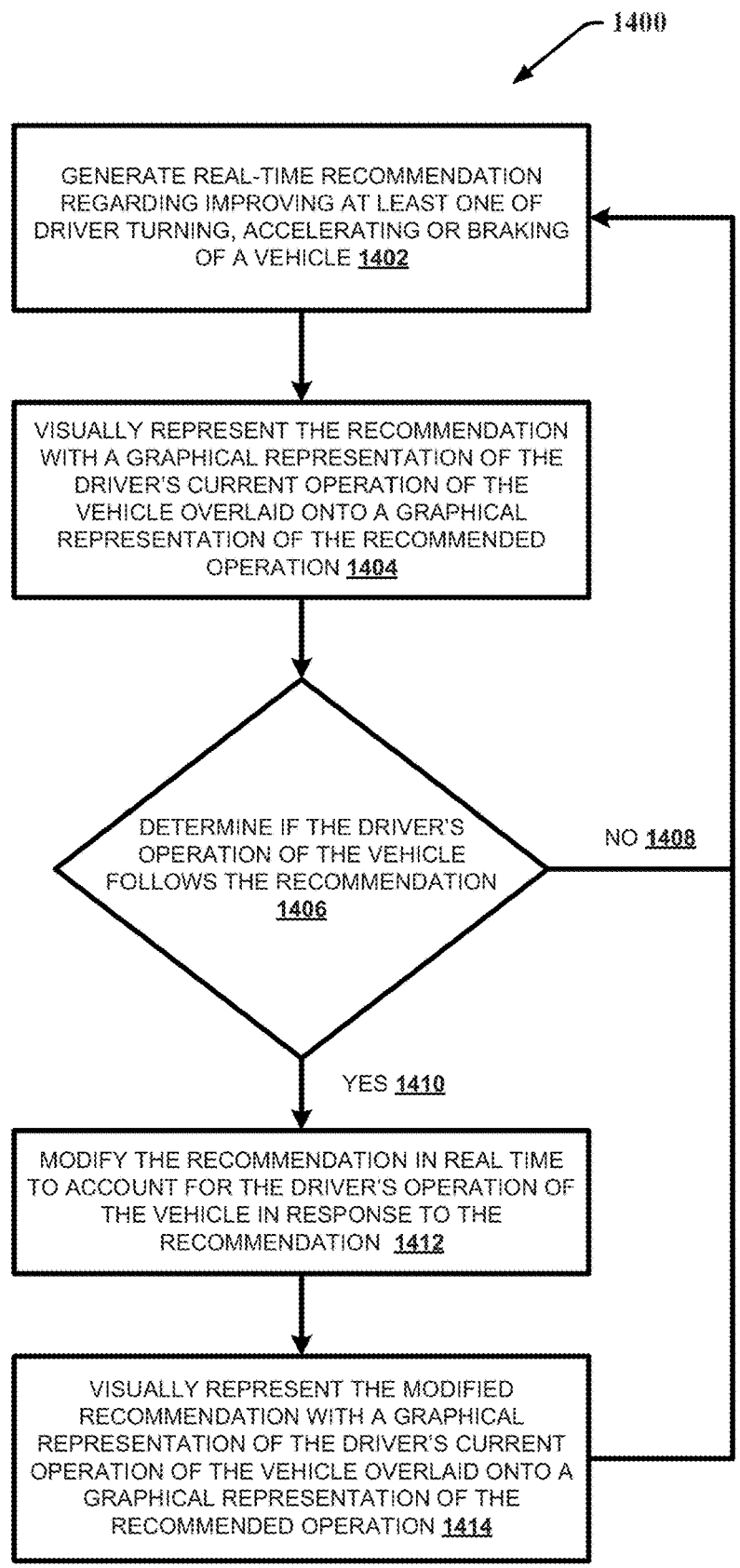
FIG. 14 illustrates a flow diagram of an example of a method to facilitate driver assist interface in a vehicle in accordance with one or more embodiments described herein.

FIG. 14 illustrates another basic method flowchart 1300 of functional acts within various embodiments. Repetitive description of like elements employed in other embodiments described herein is omitted for sake of brevity. The method to facilitate displaying next action of an autonomous vehicle illustrated in FIG. 14 can be implemented in the system 100 of FIG. 1. As such, reference is to be made to the example of FIG. 1 in the following discussion of the example of FIG. 14.

Thus, in the example of FIG. 14, a sequence to facilitate driver assist interface in a vehicle 1400 is outlined. The sequence begins at 1402 where a real-time recommendation is generated regarding improving at least one of driver turning, accelerating or braking of a vehicle. At 1404, the recommendation is visually represented with a graphical representation of the driver's current operation of the vehicle overlaid onto a graphical representation of the recommended operation. At 1406, it is determined if the driver's operation of the vehicle follows the recommendation. For example, the recommendation for a left turn can include an optimal turn radius. If the driver doesn't turn the steering wheel far enough or turns it too far to follow the recommended turn radius, the recommended turn radius can change in real time during the turn. If the driver follows the recommendation 1408, the recommendation at 1402 is unchanged. If the driver does not follow the recommendation 1410, at 1412, the recommendation is modified in real time to account for the driver's operation of the vehicle in response to the recommendation. At 1414, the modified recommendation is visually represented with the driver's current operation of the vehicle overlaid onto a graphical representation of the recommended operation.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
   a memory that stores computer executable components;
   a processor that executes computer executable components stored in the memory;
      a monitoring component that monitors driving operations by a driver of a vehicle;
      an analysis component that analyzes the driving operations by the driver of the vehicle;
      a recommendation component that generates, in real-time, based on the analyzing, recommendations comprising at least one of a first amount of turning the driver should apply to a steering wheel for turning of the vehicle, a second amount of pressure the driver should apply to a gas pedal for accelerating of the vehicle, or a third amount of pressure the driver should apply to a brake pedal for braking of the vehicle, wherein the recommendations are selected to conform with an operational characteristic of the vehicle defined for a current driving mode of the vehicle of a plurality of driving modes of the vehicle; and
      an interactive display component that generates, in real-time, a graphical user interface that visually represents the recommendations relative to the driving operations by the driver of the vehicle, wherein the graphical user interface comprises a first graphical representation of the driving operations by the driver of the vehicle overlaid onto a second graphical representation of the recommendations.

2. The system of claim 1, further comprising an audio component that generates audio instructions associated with the recommendations.

3. The system of claim 2, further comprising a feedback component that generates an assessment of the driving operations by the driver of the vehicle in relation to the recommendations.

4. The system of claim 3, further comprising an instruction component that generates instructions on how the driver can improve future driving operations by the driver of the vehicle.

5. The system of claim 1, wherein the recommendation component employs crowdsourcing to facilitate generating the recommendations.

6. The system of claim 1, wherein the recommendation component employs artificial intelligence component to facilitate generating the recommendations.

7. The system of claim 1, wherein the interactive display component visually represents the recommendations relative to the driving operations by the driver of the vehicle in an augmented realty environment.

8. The system of claim 1, further comprising a context component that monitors a context of at least one of the vehicle or the driver.

9. The system of claim 8, further comprising an alert component that generates an alert for the driver, and performs a risk assessment that factors safety based on the context.

10. The system of claim 9, further comprising an action component that takes automated action associated with control or operation of the vehicle based on an action recommended in the alert.

11. A computer-implemented method comprising:
   monitoring, by a device operatively coupled to a processor, driving operations by a driver of a vehicle;

analyzing, by the device, the driving operations by the driver of the vehicle;

generating, by the device in real-time, based on the analyzing, recommendations comprising at least one of a first amount of turning the driver should apply to a steering wheel for turning of the vehicle, a second amount of pressure the driver should apply to a gas pedal for accelerating of the vehicle, or a third amount of pressure the driver should apply to a brake pedal for braking of the vehicle, wherein the recommendations are selected to conform with an operational characteristic of the vehicle defined for a current driving mode of the vehicle of a plurality of driving modes of the vehicle; and generating, by the device, in real-time, a graphical user interface that visually represents the recommendations relative to the driving operations by the driver of the vehicle, wherein the graphical user interface comprises a first graphical representation of the driving operations by the driver of the vehicle overlaid onto a second graphical representation of the recommendations.

12. The method of claim 11, further comprising generating audio instructions associated with the recommendations.

13. The method of claim 11, further comprising generating feedback associated with an assessment of the driving operations by the driver of the vehicle in relation to the recommendations.

14. The method of claim 11, further comprising generating instructions on how the driver can improve future driving operations by the driver of the vehicle.

15. The method of claim 11, further comprising employing crowdsourcing to facilitate generating the recommendations.

16. The method of claim 15, further comprising utilizing artificial intelligence to facilitate the generating of the recommendations.

17. The method of claim 11, further comprising visually representing the recommendations relative to the driving operations by the driver of the vehicle in an augmented realty environment.

18. The method of claim 11, further comprising monitoring a context of at least one of the vehicle or the driver.

19. The method of claim 18, further comprising generating an alert for the driver, and performing a risk assessment that factors safety based on the context.

20. The method of claim 19, further comprising taking automated action associated with control or operation of the vehicle based on an action recommended in the alert.

21. A computer program product comprising a non-transitory computer readable medium having program instructions embodied therewith, the program instructions are executable by a processor to cause the processor to:

monitor, by the processor, driving operations by a driver of a vehicle;

analyze, by the processor, the driving operations by the driver of the vehicle;

generate, by the processor, in real-time, based on the analyzing, recommendations comprising at least one of a first amount of turning the driver should apply to a steering wheel for turning of the vehicle, a second amount of pressure the driver should apply to a gas pedal for accelerating of the vehicle, or a third amount of pressure the driver should apply to a brake pedal for braking of the vehicle, wherein the recommendations are selected to conform with an operational characteristic of the vehicle defined for a current driving mode of the vehicle of a plurality of driving modes of the vehicle; and generate, by the processor, in real-time, a graphical user interface that visually represents the recommendations relative to the driving operations by the driver of the vehicle, wherein the graphical user interface comprises a first graphical representation of the driving operations by the driver of the vehicle overlaid onto a second graphical representation of the recommendations.

22. The computer program product of claim 21, where the program instructions are executable by the processor to further cause the processor to generate audio instructions associated with the recommendations.

23. The computer program product of claim 21, where the program instructions are executable by the processor to further cause the processor to generate feedback associated with an assessment of the driving operations by the driver of the vehicle in relation to the recommendations.

* * * * *